United States Patent
Moon et al.

(10) Patent No.: US 10,095,380 B2
(45) Date of Patent: Oct. 9, 2018

(54) METHOD FOR PROVIDING INFORMATION BASED ON CONTENTS AND ELECTRONIC DEVICE THEREOF

(71) Applicant: Samsung Electronics Co., Ltd., Gyeonggi-do (KR)

(72) Inventors: Byung-Hyuk Moon, Gyeongsangbuk-do (KR); Kyu-Chul Kong, Gyeongsangbuk-do (KR); Hyun-Woong Kwon, Daegu (KR); Keun-Soo Kim, Gyeongsangbuk-do (KR); Jeong-Hoon Kim, Gyeongsangbuk-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 230 days.

(21) Appl. No.: 14/470,850

(22) Filed: Aug. 27, 2014

(65) Prior Publication Data

US 2015/0067609 A1    Mar. 5, 2015

(30) Foreign Application Priority Data

Aug. 27, 2013    (KR) .................. 10-2013-0101507

(51) Int. Cl.
*G06F 3/0482*    (2013.01)
*G06F 3/0481*    (2013.01)
(Continued)

(52) U.S. Cl.
CPC ........ *G06F 3/0482* (2013.01); *G06F 3/04817* (2013.01); *G06F 3/04842* (2013.01); *G06F 3/04883* (2013.01)

(58) Field of Classification Search
CPC .................... G06F 3/0482; G06F 3/04817
(Continued)

(56) References Cited

U.S. PATENT DOCUMENTS 7,568,204 B1 *  7/2009  Hudis .................. G06F 9/54
                                                707/999.001
7,634,718 B2    12/2009  Nakajima
(Continued)

FOREIGN PATENT DOCUMENTS

CN          101647031 A      2/2010
KR      10-2006-0057051      5/2006
(Continued)

OTHER PUBLICATIONS

Extended European Search Report dated Nov. 12, 2014 in connection with European Patent Application No. 14182300.5; 6 pages.
(Continued)

*Primary Examiner* — Daeho D Song

(57) ABSTRACT

A method for obtaining information and an electronic device thereof. The method for obtaining the information in the electronic device includes: displaying one or more representing objects for representing contents on a display area; determining a selection area which is at least part of the display area based on a user input; detecting a representing object of the one or more representing objects as a clip object corresponding to the user input, wherein at least part of the representing object corresponds to the selection area; and recognizing a content corresponding to the clip object.

22 Claims, 10 Drawing Sheets

(51) Int. Cl.
*G06F 3/0488* (2013.01)
*G06F 3/0484* (2013.01)

(58) Field of Classification Search
USPC .......................................... 715/835, 769, 770
See application file for complete search history.

(56) References Cited

U.S. PATENT DOCUMENTS

| | | | | |
|---|---|---|---|---|
| 7,908,564 B2* | 3/2011 | Hara | ...................... | G06F 3/0481 715/224 |
| 8,031,943 B2* | 10/2011 | Chen | ...................... | G06F 9/543 382/182 |
| 8,086,999 B2* | 12/2011 | Berstis | .................. | G06F 17/289 715/724 |
| 8,269,847 B2* | 9/2012 | Nagatomo | .............. | G06T 13/80 348/211.2 |
| 8,276,090 B2* | 9/2012 | Chen | ...................... | G06F 17/211 715/206 |
| 8,312,388 B2* | 11/2012 | Yoshihama | ........ | G06F 17/30899 715/745 |
| 8,782,077 B1* | 7/2014 | Rowley | ............. | G06F 17/30864 707/769 |
| 2003/0210428 A1* | 11/2003 | Bevlin | .................. | G06K 9/2063 358/1.18 |
| 2004/0257346 A1* | 12/2004 | Ong | ..................... | G06F 3/03545 345/179 |
| 2005/0190279 A1* | 9/2005 | Nobels | ............... | H04N 1/00127 348/333.02 |
| 2006/0114239 A1* | 6/2006 | Nakajima | ........... | G06F 3/04883 345/173 |
| 2006/0274086 A1* | 12/2006 | Forstall | ................... | G06F 9/543 345/629 |
| 2006/0277460 A1* | 12/2006 | Forstall | ............. | G06F 17/30905 715/234 |
| 2006/0277481 A1* | 12/2006 | Forstall | ............. | G06F 17/30899 715/764 |
| 2007/0067272 A1* | 3/2007 | Flynt | ..................... | G06F 3/0482 |
| 2007/0073751 A1* | 3/2007 | Morris | .................. | G06F 3/0486 |
| 2007/0106952 A1* | 5/2007 | Matas | ............... | G06F 17/30905 715/764 |
| 2007/0266342 A1* | 11/2007 | Chang | ............... | G06F 17/30867 715/810 |
| 2007/0294630 A1* | 12/2007 | Duncan | ................... | G06F 17/24 715/764 |
| 2008/0034318 A1* | 2/2008 | Louch | ................... | G06F 3/0486 715/781 |
| 2009/0044140 A1* | 2/2009 | Chen | ..................... | G06F 3/0481 715/770 |
| 2009/0089752 A1* | 4/2009 | Tristram | ................... | G06F 8/34 717/120 |
| 2009/0158186 A1* | 6/2009 | Bonev | ................... | G06Q 30/00 715/769 |
| 2010/0122195 A1* | 5/2010 | Hwang | ................. | G06F 3/0488 715/769 |
| 2012/0163668 A1 | 6/2012 | Englund et al. | | |
| 2015/0019413 A1* | 1/2015 | Lazarus | ........... | G06F 17/30011 705/39 |

FOREIGN PATENT DOCUMENTS

| | | |
|---|---|---|
| KR | 10-2012-0084861 | 7/2012 |
| KR | 10-2012-0107356 | 10/2012 |

OTHER PUBLICATIONS

Foreign Communication From a Related Counterpart Application, Chinese Application No. 201410427871.1, Text of the First Office Action dated Feb. 15, 2017, 23 pages.

Communication from a foreign patent office in a counterpart foreign application, European Patent Office, "Communication pursuant to Article 94(3) EPC," Application No. EP 14182300.5, dated Jun. 1, 2018, 5 pages.

* cited by examiner

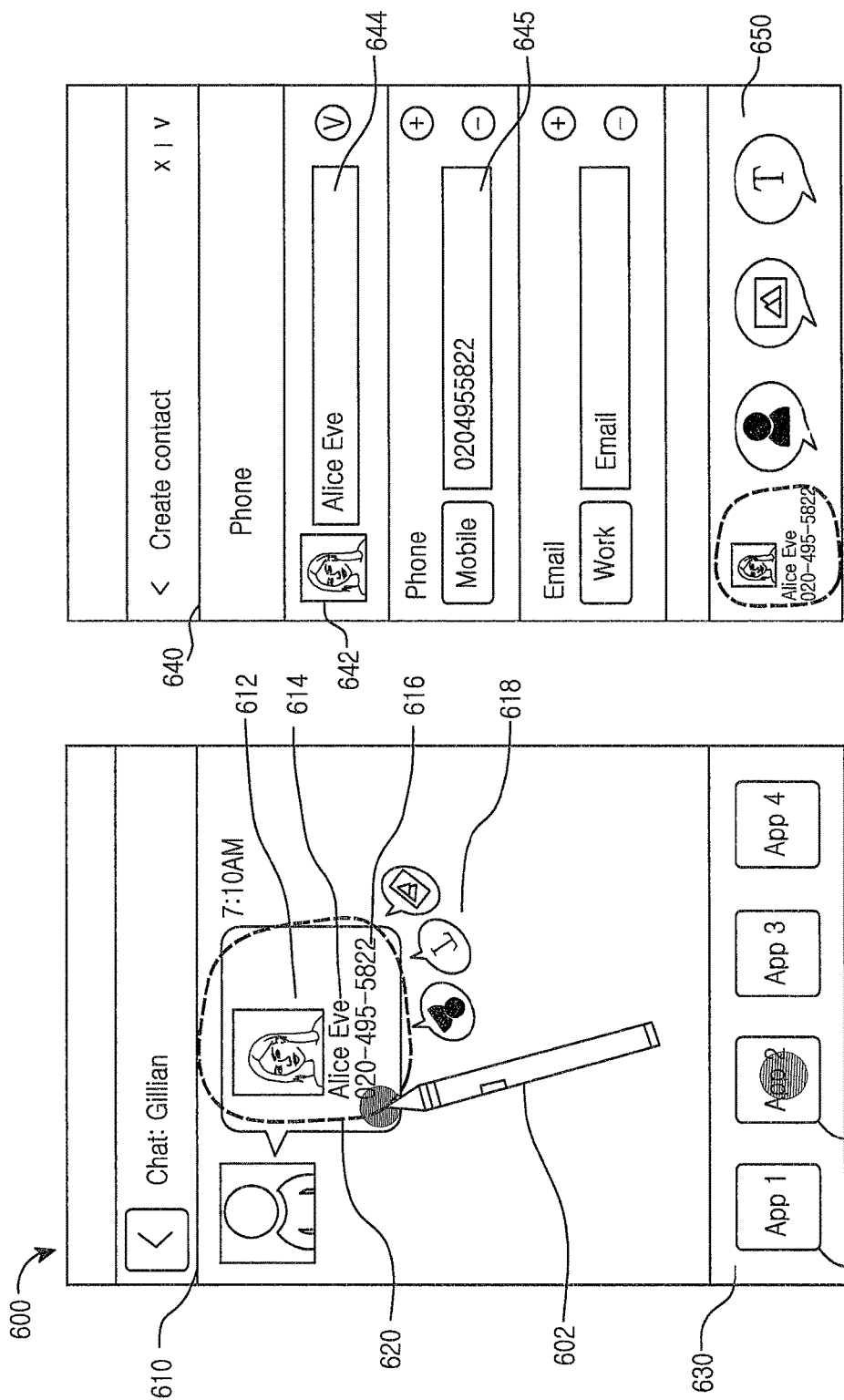

METHOD FOR PROVIDING INFORMATION BASED ON CONTENTS AND ELECTRONIC DEVICE THEREOF

PRIORITY

The present application is related to and claims priority under 35 U.S.C. § 119 to an application filed in the Korean Intellectual Property Office on Aug. 27, 2013 and assigned Serial No. 10-2013-0101507, the contents of which are incorporated herein by reference.

TECHNICAL FIELD

Exemplary embodiments relate to a method for providing information based on contents and an electronic device thereof.

BACKGROUND

Electronic devices are able to provide a variety of digital information such as a photo, a moving image, music, a document, a map, a game, a message, and the like to users. The electronic device may obtain such digital information from a server or another electronic device through a communication interface, or may obtain the digital information from a storage device functionally connected to the electronic device.

The electronic device is developing to be able to perform various functions complexly. For example, as user devices like smart phones have become popular, a variety of digital information are actively generated and consumed in the electronic device.

The electronic device may provide functions of displaying a variety of digital information on a screen, and converting the information displayed on the screen into image data and storing the image data.

The above information is presented as background information only to assist with an understanding of the present disclosure. No determination has been made, and no assertion is made, as to whether any of the above might be applicable as prior art with regard to the present disclosure.

SUMMARY

A related-art electronic device provides a function of storing an entirety or part of aH display screen as image data. Therefore, it is difficult to access original data again and there is a problem that stored data cannot be utilized in various ways.

In addition, since a user interface provided to select data is limited, a selection error frequently occurs and it is difficult to perform a work.

In addition, for example, a related-art clipboard function cannot selectively use stored data according to an application.

To address the above-discussed deficiencies, it is a primary object to provide a method and device for providing information based on contents information, which can extract and store digital information in various ways and can share and use stored data easily.

According to an aspect of the present disclosure, a method for obtaining information includes displaying one or more representing objects for representing contents on a display area. The method also includes determining a selection area which is at least a part of the display area based on a user input. The method also includes detecting a representing object at least a part of which corresponds to the selection area from among the at least one representing objects, as a clip object corresponding to the user input. The method also includes recognizing a content corresponding to the clip object.

According to another aspect of the present disclosure, an electronic device for obtaining information includes an interface module for displaying one or more representing objects for representing contents on a display area. The electronic device also includes a determination module for recognizing a selection area which is at least a part of the display area based on a user input. The electronic device also includes an obtaining module for detecting a representing object at least a part of which corresponds to the selection area from among the at least one representing objects, as a clip object corresponding to the user input, and for recognizing a content corresponding to the clip object.

The above information is presented to provide a general summary of the present disclosure, and is not comprehensive information of its full scope.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B illustrate views showing an example of a user interface which is provided by an electronic device according to various exemplary embodiments;

DETAILED DESCRIPTION

Figure 1:
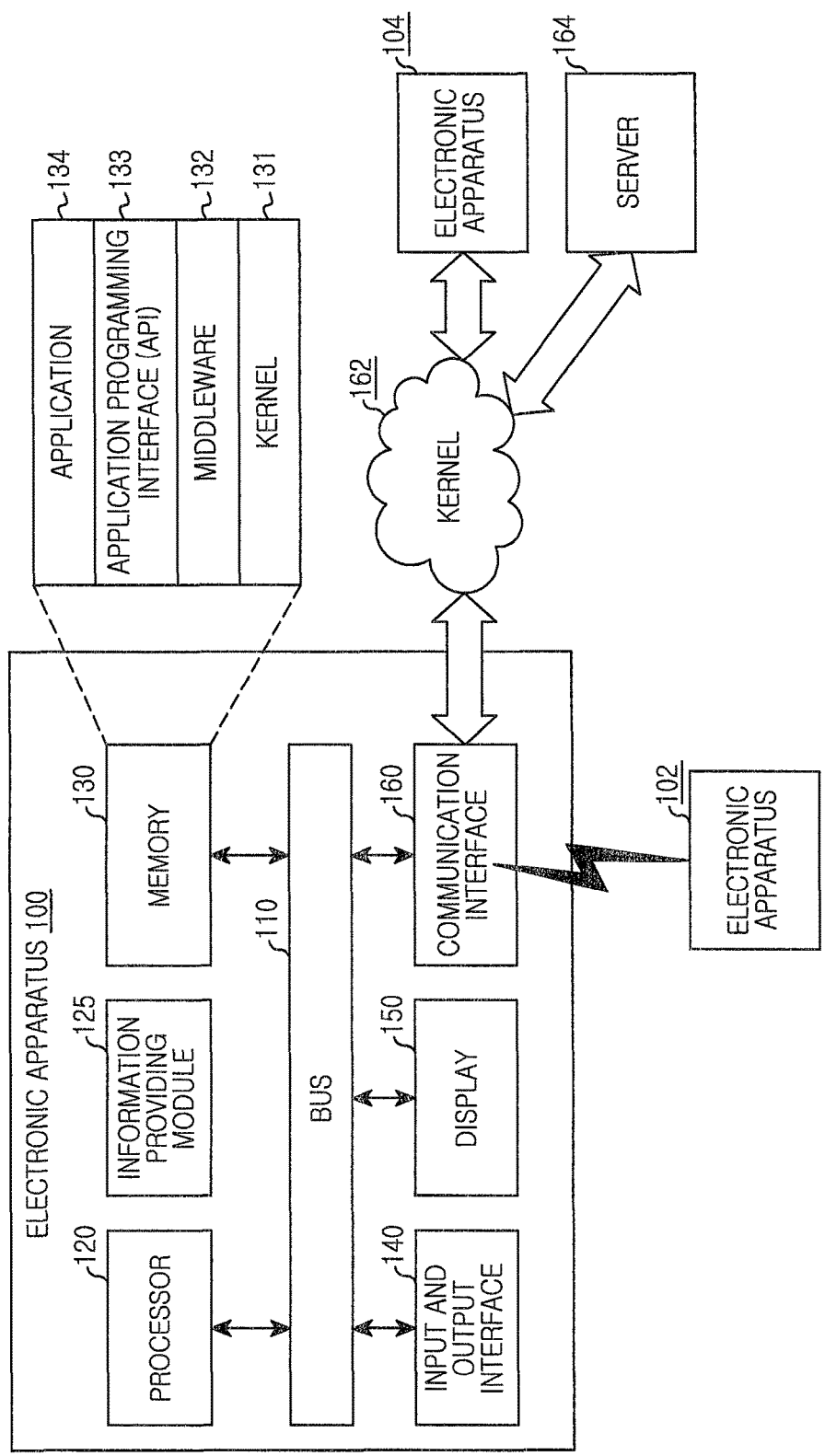
FIG. 1 illustrates a view schematically showing an electronic device according to various exemplary embodiments.

The following description with reference to the accompanying drawings, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Exemplary embodiments of the present disclosure will be described herein below with reference to the accompanying drawings. Although specific embodiments of the present disclosure are illustrated in the drawings and relevant detailed descriptions are provided, various changes can be made and various exemplary embodiments may be provided. Accordingly, the various exemplary embodiments of the present disclosure are not limited to the specific embodiments and should be construed as including all changes, equivalents or substitutes included in the ideas and technological scopes of the exemplary embodiments of the present disclosure. In the explanation of the drawings, similar reference numerals are used for similar elements. In addition, detailed descriptions of well-known functions or configurations will be omitted since they would unnecessarily obscure the subject matters of the present disclosure. In the following descriptions, only the part necessary to understand operations according to the exemplary embodiments of the present disclosure will be described and descriptions of the other parts will be omitted not to obscure the essence of the exemplary embodiments of the present disclosure.

The terms "include" or "may include" used in the exemplary embodiments of the present disclosure indicate the presence of disclosed corresponding functions, operations, elements, and the like, and do not limit additional one or more functions, operations, elements, and the like. In addition, it should be understood that the terms "include" or "has" used in the exemplary embodiments of the present disclosure are to indicate the presence of features, numbers, steps, operations, elements, part, or a combination thereof described in the specifications, and do not preclude the presence or addition of one or more other features, numbers, steps, operations, elements, parts, or a combination thereof.

An electronic device according to various exemplary embodiments of the present disclosure may be a device that is equipped with a communication function. For example, the electronic device may include a smart phone, a tablet PC, a mobile phone, a video phone, an electronic book reader, a desk top PC, a laptop PC, a net book computer, a Personal Digital Assistant (PDA), a Portable Multimedia Player (PMP), an MP3 player, a mobile medical machine, a camera, and a wearable device (for example, at least one of a head-mounted-device (HMD) such as electronic glasses, electronic clothing, an electronic bracelet, an electronic necklace, an electronic accessory, and a smart watch).

According to an exemplary embodiment, the electronic device may be a smart home appliance that is equipped with a communication function. For example, the smart home appliance may include at least one of a television, a Digital Versatile Disk (DVD) player, a stereo, a refrigerator, an air conditioner, a cleaner, an oven, a microwave oven, a washing machine, an air cleaner, a set-top box, a TV box (for example, Samsung HomeSync™, Apple TV™, or Goggle TV™), a game console, an electronic dictionary, an electronic key, a camcorder, and an electronic album.

According to an exemplary embodiment, the electronic device may include at least one of various medical machines (for example, Magnetic Resonance Angiography (MRA), Magnetic Resonance Imaging (MRI), Computerized Tomography (CT), a tomograph, an ultrasound machine, and the like), a navigation device, a Global Positioning System (GPS) receiver, an Event Data Recorder (EDR), a Flight Data Recorder (FDR), an automotive infotainment device, an electronic equipment for ship (for example, a navigation equipment for ship, a gyro compass, and the like), an airline electronic device, and a security device.

According to an exemplary embodiment, the electronic device may include at least one of a part of furniture or a building/a structure equipped with a communication function, an electronic board, an electronic signature input device, a projector, and various measurement devices (for example, water, power, gas, radio waves, and the like). The electronic device according to various exemplary embodiment of the present disclosure may be a combination of one or more of the above-mentioned devices. In addition, it is obvious to an ordinary skilled person in the related art that the electronic device according to various exemplary embodiments of the present disclosure is not limited to the above-mentioned devices. Hereinafter, an electronic device according to various exemplary embodiments will be explained with reference to the accompanying drawings. The term "user" used in various exemplary embodiments may refer to a person who uses the electronic device or a device that uses the electronic device (for example, an artificial intelligence electronic device).

FIG. 1 illustrates a view schematically showing an electronic device 100 according to various exemplary embodiments. Referring to FIG. 1, the electronic device 100 may include a bus 110, a processor 120, an information providing module 125, a memory 130, an input and output interface 140, a display 150, or a communication interface 160.

The bus 110 may be a circuit that connects the above-described elements to one another and transmits communication (for example, a control message) between the above-described elements.

For example, the processor 120 may receive an instruction from other elements (for example, the information providing module 125, the memory 130, the input and output interface 140, the display 150, the communication interface 160, and the like) through the bus 110, decipher the received instruction, and perform calculation or data processing according to the deciphered instruction.

The information providing module 125 may select or process at least a part of digital information which is obtained from other elements (for example, the processor 120, the memory 130, the input and output interface 140, the communication interface 160, and the like), and may provide the at least part of the digital information to the user in various ways. Additional information on the information providing module 125 will be provided below through FIGS. 2 to 10.

The memory 130 may store an instruction or data which is received from the processor 120 or other elements (for example, the information providing module 125, the input and output interface 140, the display 150, the communication interface 160, and the like), or is generated by the processor 120 or other elements. For example, the memory 130 may include programming modules such as a kernel 131, middleware 132, an Application Programming Interface (API) 133, an application 134, and the like. Each of the above-mentioned programming modules may be configured by software, firmware, hardware, or a combination of two or more of them.

The kernel 131 may control or manage system resources (for example, the bus 110, the processor 120, the information providing module 125, the memory 130, and the like) which are used for performing operations or functions implemented in the other programming modules, for example, the middleware 132, the API 133, or the application 134. In addition, the kernel 131 may provide an interface for allowing the middleware 132, the API 133, or the application 134 to access an individual element of the electronic device 100 and control or manage the element.

The middleware 132 may serve as an intermediary to allow the API 133 or the application 134 to communicate with the kernel 131 and exchange data with the kernel 131. In addition, the middleware 132 may perform controlling (for example, scheduling or load balancing) with respect to work requests received from the application 134 (a plurality of applications), for example, by giving priority to use the system resources of the electronic device 100 (for example, the bus 110, the processor 120, the information providing module 125, the memory 130, and the like) to at least one of the applications 134 (the plurality of applications).

The API 133 is an interface for allowing the application 134 to control a function provided by the kernel 131 or the middleware 134, and, for example, may include at least one interface or function (for example, an instruction) for controlling a file, controlling a window, processing an image, or controlling a text.

The input and output interface 140 may receive an instruction or data from the user and may transmit the same to the processor 120, the information providing module 125, or the memory 130 through the bus 110, for example. In addition, the input and output interface 140 may output audio information received from the information providing module 125, the memory 130, or the communication interface 160 through the bus 110.

The display 150 may display an image, video, or data for the user.

The communication interface 160 may establish communication between the electronic device 100 and one or more different electronic devices 102. The communication interface 160 may support a predetermined short-range communication protocol 162 (for example, Wireless Fidelity (WiFi), Bluetooth (BT), Near Field Communication (NFC), or predetermined network communication (for example, Internet, a Local Area Network (LAN), a Wide Area Network (WAN), a telecommunication network, a cellular network, a satellite network, a Plain Old Telephone Service (POTS), and the like)). Each of the electronic devices 102 and 104 may be the same device as the electronic device 100 (for example, the same type of device) or a different device (for example, a different type of device).

Figure 2:
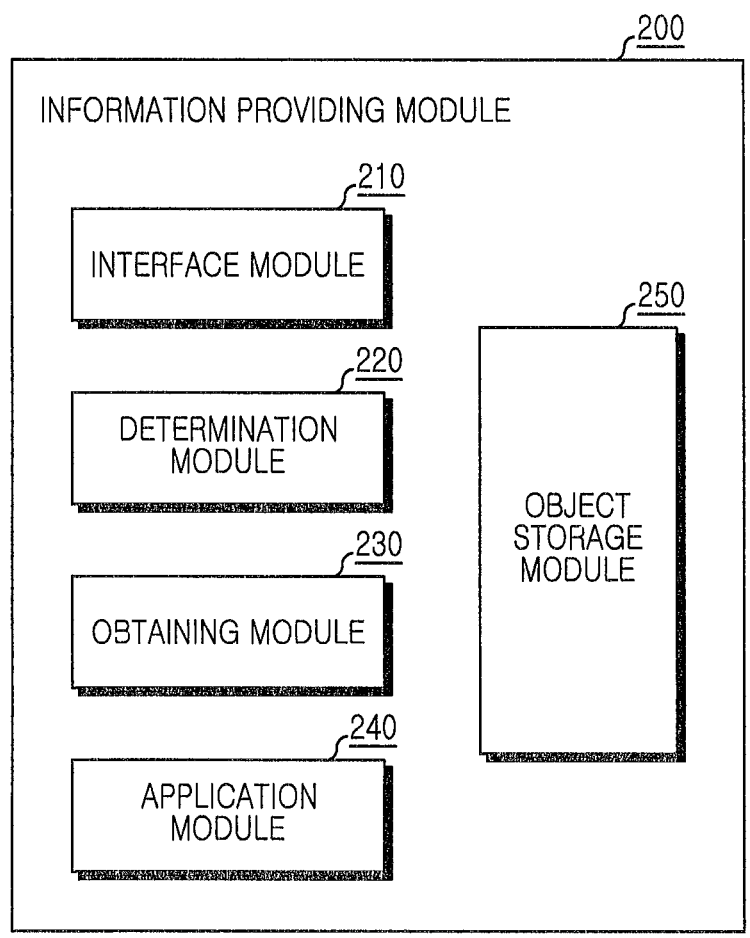
FIG. 2 illustrates a view schematically showing an information providing module according to various exemplary embodiments.

FIG. 2 illustrates a view schematically showing an information providing module 200 (for example, the information providing module 125) according to various exemplary embodiments. The information providing module 200 may process pieces of digital information provided through an electronic device (for example, the electronic device 100) and may provide the digital information to the user in various ways. Referring to FIG. 2, the information providing module 200 may include an interface module 210, a determination module 220, an obtaining module 230, an application module 240, and an object storage module 250.

The interface module 210 may receive a variety of information related to the information providing module 200 from an external device or the user or may output information to the external device or the user.

According to an exemplary embodiment, the interface module 210 may provide one or more pieces of digital information (for example, contents) through an input and output interface (for example, the input and output interface 140) or a display (for example, the display 150) which is functionally connected to the electronic device (for example, the electronic device 100). The variety of digital information provided by the interface module 210 may include at least one content of an image, a text, audio, and video, for example.

According to an exemplary embodiment, the electronic device (for example, the electronic device 100) may display various contents provided through the electronic device as "representing objects" constituting a user interface. For example, when the contents are displayed through the display, the contents constituting a display screen may be designated as representing object information including at least one of location coordinates information on the screen, hierarchical relationship information with other representing objects, and display attribute information regarding a providing method. For example, the contents may be displayed as representing objects corresponding to the contents by various applications or programs, and may provide a variety of information to the user.

According to an exemplary embodiment, the same content may be designated as a separate representing object according to a kind of application or program.

According to an exemplary embodiment, the interface module 210 may process a selection input on the representing objects (for example, may receive or convert a selection input). For example, the interface module 210 may receive a user input to select at least a part of the screen. The selection input may be performed as a part of an operation of selecting and storing at least a part of one or more contents provided through the information providing module 200 (for example, referred to as "clipping" for convenience of explanation).

The selection input may be performed in various ways (for example, a touch, hovering, a gesture, an electronic pen, a mouse cursor, a button, and the like). According to an exemplary embodiment, the user may designate at least a part of the screen as a specific area and may clip contents of the specific area (or contents displayed on the specific area). For example, the user may designate the specific area by dragging on the screen using an input tool such as an electronic pen (or a digital pen), such that the specific area includes a start point and an end point of the dragging. The interface module 210 may display information on the selection input on the screen, for example.

According to an exemplary embodiment, the selection input may be performed by not only the user but also an application. For example, when an application in which a specific condition is set detects a content satisfying the specific condition on the currently displayed screen, the application may perform the selection input.

The determination module 220 may determine a selection area to select or store contents. According to an exemplary embodiment, the determination module 220 may determine the selection area based on the selection input which is received by the interface module 210. For example, by identifying coordinates corresponding to points at which the selection input is recognized, the determination module 220 may determine an area that includes the points at which the selection input is recognized or an area that has a line connecting the points at which the selection input is recognized as a boundary line, as the selection area corresponding to the selection input.

According to an exemplary embodiment, the determination module 220 may determine or change the selection area based on an input method (for example, a touch, hovering, a gesture, an electronic pen, a mouse cursor, a button, and the like) or a shape of the selection input. For example, the determination module 220 may analyze the coordinates corresponding to the points at which the selection input is recognized, and may determine the shape of the selection input based on the analysis. The determination module 220 may determine a shape of the selection area (for example, a rectangle, a circle, and the like) based on the shape of the selection input (for example, a looped curve, a curve, a straight line, a rectangle, a circle, and the like)

For example, the selection input by the user may be recognized as various looped curves. The determination module 220 may generate a figure (for example, a rectangle) circumscribed about the looped curve corresponding to the selection input. In this embodiment, for example, at least an area that corresponds to the circumscribed figure out of the display areas may be determined as the selection area. In addition, for example, the determination module 220 may generate a figure (for example, a rectangle) inscribed in the looped curve input by the user. In this embodiment, at least an area that corresponds to the inscribed figure out of the display areas may be determined as the selection area.

According to an exemplary embodiment, the selection input by the user may be recognized as various curves or various straight lines. For example, the determination module 220 may generate a shape of a specific figure (for example, a rectangle) based on two points (for example, opposite end points) located on the curve or straight line corresponding to the selection input. For example, the figure formed by using the two points may be a rectangle that has a line connecting the two points as a diagonal line. In this embodiment, at least an area that corresponds to the generated figure out of the display areas may be determined as the selection area.

According to an exemplary embodiment, the determination module 220 may provide a user interface for changing the shape of the selection area corresponding to the selection input, from a first shape which is the same as the shape of the selection input from a second shape which is different from the shape of the selection input, through the interface module 210. For example, when the selection input is recognized as a shape similar to a circle (for example, an embodiment in which the circle is not formed when all of the points at which the selection input is recognized are connected, but the circle is formed when some of the points are connected), the determination module 220 may display an option (icon) to change the shape of the selection area to the circle. In addition, for example, when the selection input is recognized as a shape similar to a rectangle (for example, an embodiment in which the rectangle is not formed when all of the points at which the selection input is recognized are connected, but the rectangle is formed when some of the points are connected), the determination module 220 may display an option (icon) to change the shape of the selection area to the rectangle or square. When a user input on the option is received, the determination module 220 may change the shape of the selection area to the figure corresponding to the option.

According to an exemplary embodiment, the determination module 220 may determine the selection area to be suitable to the contents corresponding to the selection input. For example, the determination module 220 may designate the selection area to be formed along a boundary of the contents. The determination module 220 may provide one or more options (icons) related to the above operation through the interface module 210.

According to various exemplary embodiments, the selection area may be changed (or adjusted) based on the representing object information corresponding to the selection area. For example, at least one representing object corresponding to the selection input which is received through the interface module 210 may be obtained by the obtaining module 230, which will be described below. In this embodiment, the determination module 220 may change the selection area such that the whole representing object is located at least in the selection area.

For example, when the interface module 210 receives the selection input by the user (for example, a straight line input or a hovering input) and transmits the selection input to the determination module 220, the determination module 220 determines the selection area based on the selection input and transmits the selection area to the obtaining module 230, which will be described below. For example, the obtaining module 230 may obtain one or more representing objects located in the selection area as clip objects (or selecting objects) based on location information of the selection area. When the clip object is obtained, the determination module 220 may determine whether the selection area previously determined (for example, the selection area determined before the clip object is obtained) includes all of one or more clip object areas (for example, screen display areas of the contents). For example, when the previously determined selection area does not include all of the one or more clip object areas, the determination module 220 may change the shape or size of the selection area such that the selection area includes all of the one or more clip object areas. According to various exemplary embodiments, the interface module 210 may display the changed selection area on the screen.

The obtaining module 230 may detect information of the representing objects corresponding to the selection area.

According to an exemplary embodiment, the display screen provided through the interface module 210 may display one or more representing objects based on information of a layout having a hierarchical structure.

For example, the hierarchical structure may include a root node and one or more child nodes (for example, a sub-layout) which are subordinate to the root node. The child nodes may further include one or more additional child nodes on their respective lower levels. The root node may indicate or include the whole layout of the display area, and each of the child nodes may indicate or include a sub-layout on at least a part of the area in the application or representing object.

According to an exemplary embodiment, the obtaining module 230 may detect the representing objects corresponding to the selection area based on information on the selection area determined by the determination module 220 and information on the representing objects stored in the object storage module 250. For example, the obtaining module 230 may detect the sub-layout corresponding to location coordinates of the selection area. When the sub-layout corresponding to the location coordinates of the selection area is detected, the obtaining module 230 may detect the representing objects to be displayed according to the sub-layout. Similarly, the obtaining module 230 may detect an additional sub-layout included in a lower level of the one or more sub-layouts corresponding to the location coordinates of the selection area, and may additionally detect the representing objects to be displayed according to the sub-layout. The detecting operation may be continuously performed until there is no additional sub-layout included in the lower level of the corresponding sub-layout. However, the present exemplary embodiment is not limited to this and another exemplary embodiment is possible.

According to an exemplary embodiment, the obtaining module 230 may obtain the detected representing objects as the clip objects.

The obtaining module 230 may obtain contents that are set to be displayed by the clip objects based on the clip objects. The contents that are set to be displayed by the clip objects will be referred to as "clipped contents" hereinafter.

The obtaining module 230 may store the clipped contents or information related to the clipped contents. In addition, the obtaining module 230 may display the clipped contents through the clip objects as described above, and also, may additionally display the information stored in relation to the clipped contents though the clip objects. According to an exemplary embodiment, the obtaining module 230 may receive a user input and may store information corresponding to the user input in relation to the clip operation. For example, the obtaining module 230 may inquire of the user about whether the user will input additional information related to the clipped contents through the interface module 210. The input of the additional information may be a hand writing input using an input tool (for example, an electronic pen). When the additional information (for example, a text) is received, the obtaining module 230 may store the additional information as information related to the clipped contents. Additionally or alternatively, the inquiry about the additional information may be performed when there is no text information as the additional information of the clipped contents.

According to various exemplary embodiments, the obtaining module 230 may obtain a variety of information related to the clipped contents. According to an exemplary embodiment, the obtaining module 230 may obtain one or more pieces of display attribute information on the clip objects. The display attribute may include a variety of information related to how each content is provided through the input and output interface (for example, the input and output interface 140) or the display (for example, the display 150) of the electronic device (for example, the electronic device 100).

According to an exemplary embodiment, the display attribute may include at least one of ID, visibility, accessibility, layout width/height, layout weight, focus, scrolling and text attributes of the representing object. The ID attribute may be a unique parameter for identifying the representing object. The visibility attribute may be a parameter for determining whether the representing object is visibly displayed or not, and may include a visible attribute (for example, the representing object is allocated a specific area, which is a part of the display area, and is visibly displayed), an invisible attribute (for example, the representing object is not visibly displayed but is allocated a specific area which is a part of the display area), or a gone attribute (for example, the representing object is not visibly displayed and is not allocated a specific area which is a part of the display area). The accessibility attribute may be a parameter that is related to a function (for example, talkback) of representing the contents of the representing objects to a deaf-blind user or a user who cannot freely move. The layout width/height attribute may be a parameter for determining the size of the area where the representing objects are displayed. The layout weight attribute may be a parameter for determining how much the representing objects occupy the area of other sub-layouts located on the upper level of the displayed sub-layout. The focus attribute may be a parameter for determining whether a focus on the representing objects is applied or not. The scrolling attribute may be a parameter related to scroll coordinates. The text attribute may be a parameter related to a length, an arrangement method, and contents of the text. Additionally or alternatively, various attributes may be defined in relation to the representing objects constituting the screen.

According to an exemplary embodiment, the obtaining module 230 may obtain kinds of the contents as related information of the contents of the representing objects located in the selection area. The kinds of the contents may include an image, a text, audio, and video, for example.

According to an exemplary embodiment, the obtaining module 230 may obtain a variety of surrounding information regarding the clip operation. For example, the obtaining module 230 may obtain as information related to the clip objects at least one of information of an application located in the upper layout of the clip objects, GPS information of a point where the electronic device performing the clip operation is located, time information of the clip operation (for example, an execution date), rights information of the contents, information of a location where the clipped original data is stored (for example, Uniform Resource Identifier (URI), Uniform Resource Locator (URL), Uniform Resource Name (URN)), metadata included in each content, thumbnail information, and information of a sensor (an altitude sensor).

According to an exemplary embodiment, the obtaining module 230 may generate additional information by analyzing the contents of the clip objects. For example, when the contents of the clip objects are a text, the obtaining module 230 may analyze the text and may determine whether the text corresponds to at least one type of date, day, month, year, time, place, phone number, email, URI, URL, URN, address, name, title, ID, password, icon, sentence symbol, and page number. For example, the obtaining module 230 may determine whether the text matches a format predefined for each type. When the text is "07/01/15" and the date format is "YY/MM/DD", it may be determined that the corresponding text corresponds to the type of the date and the date meant by the text is Jan. 15, 2007.

According to various exemplary embodiments, the interface module 210 may provide a variety of information related to the clipped contents. For example, the interface module 210 may display kinds of the contents included in the selection area and stored (for example, an image or text) through the screen. In addition, when text information is included in the clipped contents, the interface module 210 may display a message indicating the same through the screen.

According to an exemplary embodiment, one or more pieces of information related to the clipped contents (for example, kinds of the clipped contents) may be provided through the interface module 210. For example, one or more icons corresponding to the information may be displayed through the display (for example, the display 150). The icons may be displayed to overlap at least a part of the clipped contents or the clip objects or may be displayed to be adjacent to the clipped contents or the clip objects. However, the present exemplary embodiment is not limited to this and another exemplary embodiment is possible.

According to an exemplary embodiment, the icons may additionally correspond to an operation to be performed regarding the clipped contents after the clip operation, besides the information related to the clipped contents (for example, the kinds of the clipped contents). For example, an icon for indicating that the kind of the clipped content is URL may correspond to a function of displaying the URL or at least a part of a web page corresponding to the URL. For example, an icon for indicating that the kind of the clipped content is contact information may correspond to one of a function of displaying the contact information or another piece of information (an address or name) of a person of the corresponding contact information and a function of providing a telephone call service based on the phone number of the contact information.

The application module 240 may have the clipped contents interwork with one or more applications available in the electronic device (for example, the electronic device 100).

According to an exemplary embodiment, the application module 240 may detect an application that can use the clipped contents based on the clipped contents or information related to the clipped contents. For example, when one or more applications related to the clip operation of the user are detected, the application module 240 may provide a list of the applications through the interface module 210.

For example, when the clipped contents include text information and the text information is contact information, the application module 240 may detect one or more applications related to the contact information (for example, a telephone book application). In this embodiment, for example, the application module 240 may provide an icon indicating the application related to the contact information through the interface module 210. In addition, for example, when the clipped contents include date or time information, at least one of the applications related to the date or time information (for example, a calendar application, a schedule application, a notice application, and the like) may be provided.

According to an exemplary embodiment, the electronic device (for example, the electronic device 100) may provide an application for managing the clipped contents (hereinafter, referred to as a "scrap application" for convenience of explanation). For example, the clipped contents and the information related to the clipped contents may interwork with the scrap application through the application module 240, and may be stored. In addition, the scrap application may manage the data that is obtained while the clipped contents and the information related to the clipped contents are stored by classifying the data according to a category.

For example, when the clipped contents are classified as having separate original data according to the kind of the clipped contents, the scrap application may provide the original data corresponding to the clipped contents. For example, the scrap application may extract information (for example, URI or URL) for accessing the separate original data from the clipped contents or the information related to the clipped contents, and may obtain the original data based on the extracted URI or URL and may provide the original data.

According to an exemplary embodiment, the application module 240 may provide at least one application for using the clipped contents or the information related to the clipped contents (hereinafter, referred to as a "related application" for convenience of explanation).

For example, the application module 240 may give priority to the applications available in the electronic device (for example, the electronic device 100) based on the clipped contents or the information related to the clipped contents. For example, when the related applications are executed concurrently, the related application may be executed based on the given priority.

For example, the interface module 210 may display one or more options (icons) to execute the related application under the control of the application module 240 on the display area. When the related application is provided in plural number, the options may be arranged according to priority.

For example, the scrap application may have higher priority than the other applications. For example, when the icons on the one or more applications are arranged in a horizontal direction, information (for example, an icon) corresponding to the scrap application may be placed on the leftmost area of the display area where the related applications are displayed. In addition, for example, when the clipped contents include date information, information corresponding to the calendar application may be placed next (for example, on the right side of the scrap application). In addition, an application related to a text or an image (for example, an icon) may be placed next (for example, the right side of the calendar application).

According to an exemplary embodiment, the information indicating the related application (for example, an icon) may be provided to perform an operation according to user selection. The user may select one of the icons to execute a corresponding application through the interface module 210. For example, when the user performs an input (for example, a touch) on the icon, the application corresponding to the icon may be executed.

According to an exemplary embodiment, the application module 240 may transmit at least a part of the clipped contents or the information related to the clipped contents to one or more applications available in the electronic device (for example, the electronic device 100). For example, when an instruction to execute the application is generated, the application may be executed with the transmitted information being input to an input window (or a field) of the application. For example, when the schedule application is executed, the application module 240 may input contents regarding date, time, and place according to an attribute of each input window item of the schedule application. Additionally, when the clipped content corresponding to the input window exists in plural number, an option (for example, a pop-up menu) to select one of them may be provided through the interface module 210. For example, when there are two or more pieces of time information, a menu for selecting a time to be input may be provided through the interface module 210.

According to an exemplary embodiment, when the attribute or format of the input window item is different from the clipped content, the interface module 240 may change data of the clipped content into a format suitable to the input window and may input the data. For example, when a date notation order is different, the application module 240 may change the date notation order to a notation order suitable to a corresponding application and may input the date. For example, when a time display format is different (for example, 12-hour format, and 24-hour format), the application module 240 may change the time format according to a corresponding application and input the time.

According to an exemplary embodiment, when an application (for example, the related application) is executed in relation to the clip operation, the application module 240 may display one or more options (for example, icons) to use the clipped contents on a least a part of the screen. For example, the application module 240 may display the related application on a part of the display area and may display one or more icons corresponding to the clipped contents on the other area. For example, when an instruction to move one of the options to the input window included in the application (for example, a drag and drop input) is received through the interface module 210, the content corresponding to the option may be input to the input window.

The electronic device (for example, the electronic device 100) may execute a plurality of applications. For example, the interface module 210 may display the plurality of applications on a single screen by dividing a display area.

According to an exemplary embodiment, the interface module 210 may receive a user's selection input. The selection input may be performed on one of the plurality of applications. When the selection input is received, the determination module 220 may determine a selection area. The obtaining module 230 may obtain contents and information related to the contents from the object storage module 250 based on the selection area.

According to an exemplary embodiment, the interface module 210 may receive a drag input which selects at least a part of the selection area and moves to another area of the display. For example, when the plurality of applications is displayed on the screen, the user may perform clipping in one application and may move the clipped contents to an area where another application is displayed. When the drag input enters the area where another application is displayed, the application module 240 may input at least one of the clipped contents or the information related to the clipped contents to the another application (for example, pasting).

According to an exemplary embodiment, the application module 240 may receive content information to be input (for example, to be pasted) from the obtaining module 230 in response to an instruction received from the interface module 210, for example, a pasting instruction. The input may be processed by the application module 240 to be suitable to the attributes of one or more input windows included in the other application.

According to an exemplary embodiment, the operations of determining the selection input, detecting the contents, and obtaining the contents may be performed repeatedly for a predetermined time. For example, the information providing module 200 may provide an option (for example, a menu) to designate a start point of time and an end point of time of the clip operation. For example, when the option corresponding to the start point of time of the clip operation is selected, the information providing module 200 may clip one or more contents according to the user's selection input until the option corresponding to the end point of time is selected.

The object storage module 250 may store information of the representing objects which are displayed on the display area or are to be displayed. The object storage module 250 may store the representing objects and a variety of information related to the representing objects (for example, location coordinates information on the screen, hierarchical relationship information with other representing objects, and display attribute information related to a providing method). The object storage module 250 may be at least a part of a storage device (for example, the memory 130) functionally connected with the electronic device (for example, the electronic device 100).

Figure 3:
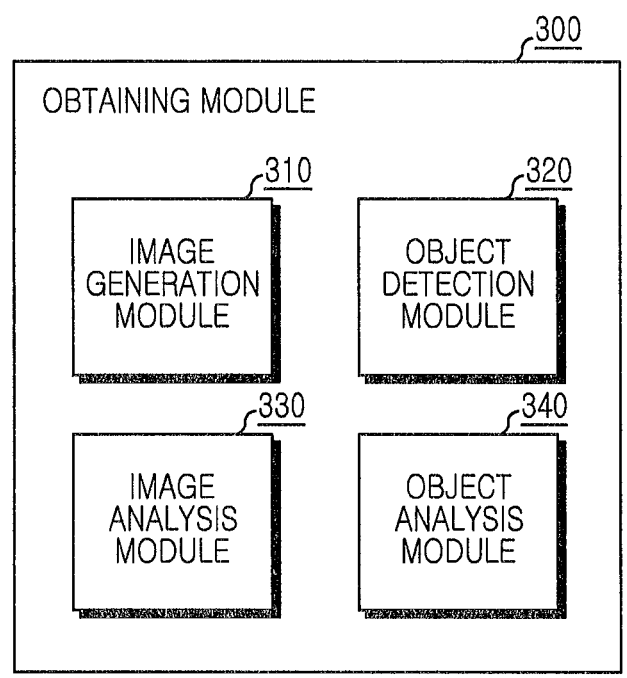
FIG. 3 illustrates a view schematically showing an obtaining module according to various exemplary embodiments.

FIG. 3 illustrates a view schematically showing an obtaining module 300 (for example, the obtaining module 230) according to various exemplary embodiments. The obtaining module 300 may correspond to the obtaining module 230 of FIG. 1. As shown in FIG. 3, the obtaining module 300 may include an image generation module 310, an object detection module 320, an image analysis module 330, and an object analysis module 340.

The image generation module 310 may generate an image based on a selection area. For example, the selection area may be determined based on a user input as described above. For example, the image generation module 310 may store the generated image in relation to clipped contents (or clip objects).

The object detection module 320 detects clip objects based on the selection area and obtains contents corresponding to the clip objects. For example, the object detection module 320 may detect representing objects located in the selection area as the clip objects corresponding to the user input, based on data of the representing objects stored in the object storage module 250 or memory (for example, the memory 130). Additional information on the operation of the object detection module 320 detecting the clip objects will be explained below with reference to FIG. 4 and detailed descriptions of FIG. 4.

The image analysis module 330 may analyze one or more image contents which are obtained by the object detection module 320 or the image which is generated by the image generation module 310.

According to an exemplary embodiment, the image analysis module 330 may extract a text by analyzing the image. For example, the text extracted by the image analysis module 330 may be additionally stored as a content corresponding to the clip object.

The object analysis module 340 may analyze the contents which are obtained by the object detection module 330 and information related to the obtained contents.

According to an exemplary embodiment, the object analysis module 340 may analyze the text included in the clipped contents. Additionally, the object analysis module 340 may determine one or more text types for the text based on the analysis. For example, one of the text types may be date. For example, the text of the date type may be related to a schedule application, a calendar application, a notice application or a do-not-disturb application.

Figures 4A, 4B, 4C:
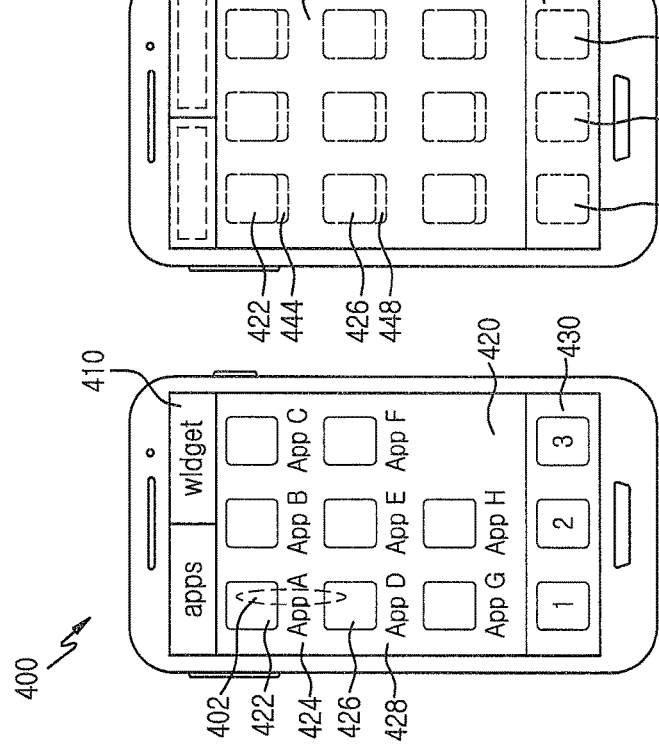
FIGS. 4A through 4C illustrate a view showing an example of an operation of selecting contents according to various exemplary embodiments.

FIG. 4 illustrates a view showing an example of a contents selecting operation according to various exemplary embodiments.

According to an exemplary embodiment, a display screen of an electronic device 400 (for example, the electronic device 100) may include a layout corresponding to the display screen, and one or more sub-layouts (for example, a first sub-layout 410, a second sub-layout 420, and a third sub-layout 430) which are subordinate to the layout and correspond to a part of the display screen, respectively.

For example, when a user input 402 on a part of the display screen is received, the electronic device 400 may recognize a location on the display screen corresponding to the user input 402. The electronic device 400 may determine in which of the three sub-layouts 410, 420, and 430 shown in FIG. 4 the recognized location is located. For example, the location corresponding to the user input may be located in the second sub-layout 420 as shown in FIG. 4. Each of the sub-layouts may include information of representing objects which are displayed or will be displayed on an area corresponding to each sub-layout. According to an exemplary embodiment, various contents (for example, images 422 and 426, text 424 and 428, and the like) may be displayed on the display screen of the electronic device 400. The contents may be displayed on the display screen through their respective representing objects (for example, an image view object, a text view object, and the like), thereby constituting a user interface. The representing objects may be a set of data that includes at least one of location coordinates information of the contents, location relationship (or a placement relationship, a hierarchical relationship) information, and display attributes along with the contents.

The representing objects constituting the screen may be hierarchically related to one another based on a hierarchical relationship between the sub-layouts to which the representing objects belong. A background representing object 440 may be a superordinate representing object of icon representing objects 442, 444, 446, and 448. Similarly, the icon representing objects 442, 444, 446, and 448 may be subordinate representing objects of the background representing object 440.

According to an exemplary embodiment, the background representing object 440 may be included in the second sub layout 420. For example, the icon representing object 442 may be a representing object for displaying the image content 422. For example, the icon representing object 444 may be a representing object for displaying the text content 424. For example, the icon representing object 446 may be a representing object for displaying the image content 426. For example, the icon representing object 448 may be a representing object for displaying the text content 428.

According to an exemplary embodiment, an object detection module (for example, the object detection module 320) of the electronic device 400 may detect information on the representing objects which currently represent the contents through the display using the location coordinates information of the selection area in order to detect clip objects. For example, the information on the representing objects may be data that is stored in an object storage module (for example, the object storage module 250) of the electronic device 400.

The object detection module (for example, the object detection module 320) may detect representing objects corresponding to the selection area by comparing the location coordinates information of the selection area and location coordinates information of each representing object in sequence from a higher layer to a lower layer in the hierarchical structure of the representing objects.

As shown in FIG. 4, the object detection module (for example, the object detection module 320) of the electronic device 400 may detect whether the representing objects of a first layer (for example, 440, 460, and the like) correspond to the selection area or not, based on the location information of the selection area. It may be identified that the background representing object 440 corresponds to the selection area based on a result of the detecting.

According to an exemplary embodiment, the object detection module (for example, the object detection module 320) of the electronic device 400 may detect the representing objects of a second layer (for example, 442, 444, 446, 448, 462, 464, and 466). For example, the object detection module may detect the representing objects of the second layer (for example, 442, 444, 446), which are subordinates to the background representing object 440 of the first layer corresponding to the selection area. For example, the icon representing objects 442, 444, and 446 from among the representing objects of the second layer may represent the first image 422, the text 424, and the second image 426, respectively. Accordingly, when the icon representing objects 442, 444, and 446 are detected as clip objects, the first image 422, the text 424, and the second image 426 corresponding to the clip objects may be obtained.

According to an exemplary embodiment, when the representing object 446 is detected as a clip object, the representing object 448 related to the clip object may be detected as an additional clip object. Accordingly, for example, the text 428 related to the representing object 448 may be obtained.

According to an exemplary embodiment, when the representing objects (for example, 442, 444, 446, and 448) are detected, an obtaining module (for example, the obtaining module 230) of the electronic device 400 may obtain one or more pieces of display attribute information on the corresponding representing objects.

According to an exemplary embodiment, the obtaining module (for example, the obtaining module 230) of the electronic device 400 may generate the screen on which contents corresponding to the selected object data are displayed as an image. In addition, for example, the obtaining module may generate an image including all of the contents 422, 424, 426, and 428 by including the object data 448 related to the object data 446 corresponding to the user input.

Figures 5A, 5B:
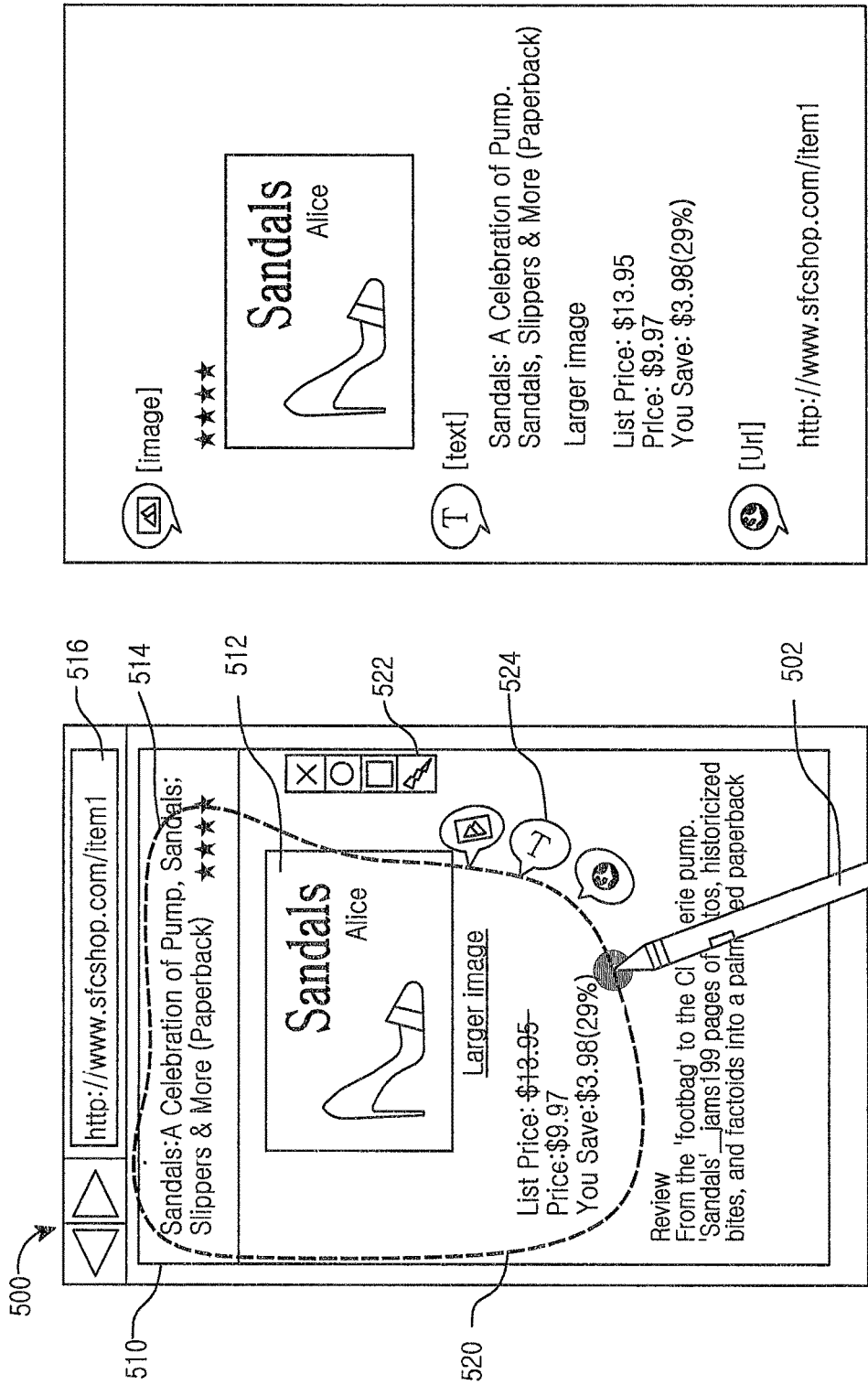
FIGS. 5A and 5B illustrate views showing an example of a user interface which is provided by an electronic device according to various exemplary embodiments.

FIGS. 5A and 5B illustrate an example of a user interface 500 which is provided by an electronic device (for example, the electronic device 100) according to various exemplary embodiments. For example, the user interface 500 may be provided through a display (for example, the display 150) functionally connected with the electronic device (for example, the electronic device 100) under the control of the interface module 210 or other elements (for example, the processor 120 or the input and output interface 140) of the electronic device (for example, the electronic device 100).

According to an exemplary embodiment, the user interface 500 may provide one or more pieces of digital information (for example, contents) through at least a part of the display. For example, the contents may be included in various applications available in the electronic device (for example, the electronic device 100). Referring to FIGS. 5A and 5B, for example, the application may be a web browser application. The web browser application may provide contents included in a web page or a file by communicating with a web server. The web pages or files located in the web server may interwork through a URL which is used as an address.

Referring to FIG. 5A, for example, the user may access a web page 510 the URL of which is http://www.sfcshop.com/item1 through the web browser application in order to obtain purchasing information of a book that the user wishes to purchase. For example, the web page 510 may provide various contents including an image 512, a text 514, and a URL 516.

According to an exemplary embodiment, the user may select or store at least a part of the contents provided through the electronic device (for example, the electronic device 100). For example, the user may perform an input to select at least a part of the display screen area. For example, the user input may be received through the interface module 210.

For example, the user input may be performed by using at least one of a part of a user's body including finger or palm, a button provided on the electronic device, a sensor, and an electronic pen. For example, a selection area may be designated by dragging an area to be clipped using an input tool such as an electronic pen (stylus) 502. The user interface 500 may display a selection area 520 designated by the user.

According to an exemplary embodiment, when the selection area 520 is designated, the electronic device (for example, the electronic device 100) may detect one or more contents included in the selection area 520. The detecting operation may be an operation of retrieving representing object data stored in the object storage module 250 under the control of the obtaining module 300 (for example, the obtaining module 230).

Referring to of FIG. 5A, the image 512 and the text 514 which are contents included in the selection area 520 may be selected. For example, the detected contents may be temporarily stored in a memory (for example, the memory 130) of the electronic device (for example, the electronic device 100) or may be stored in a separate database (DB). For example, additionally or alternatively, the URL of the web page including the selected contents may be obtained (or clipped) in relation to the selected contents.

According to an exemplary embodiment, the selection area 520 may include a part of the contents (for example, not the whole area of the contents on the screen). Referring to of FIG. 5A, although a part of the image 512 is not included in the drag area 520, the whole area of the image 512 may be stored (for example, clipped). FIG. 5B illustrates examples of the image content, text content, and URL content clipped based on the user input.

According to an exemplary embodiment, the obtaining module 230 may clip at least a part of the contents included in the selection area 520 (for example, not all contents included in the selection area).

According to an exemplary embodiment, the section area 520 may be designated for the whole screen. The selection input for the whole screen may be the same as the operation of selecting at least a part of the screen or may be performed using a different operation. For example, when the whole area of the screen is designated as the selection area, the obtaining module 230 may generate an image for the whole screen. In addition, contents information included in the whole screen may be obtained.

According to an exemplary embodiment, when the whole area of the screen is designated as the selection area, the information providing module 200 (for example, the information providing module 125) may inquire of the user about whether the user will select at least a part of the contents included in the screen. The interface module 210 may display information on the inquiry through the user interface 500. When the whole area of the screen is designated as the selection area and a user input to select at least a part of the contents included in the screen is received, the obtaining module 230 may obtain information of the contents that are selected by the user from among one or more contents included in the selection area.

According to an exemplary embodiment, when the selection area (for example, the selection area 520) is designated by the user, an option 522 (for example, an icon) to change the selection area to a different form may be provided through the user interface 500. For example, when the option is selected, the determination module 220 may change the section area 520 to a form corresponding to the selected option.

According to an exemplary embodiment, when at least one content is selected based on the user input, additional information on the selected content may be provided through the user interface 500. For example, the additional information may be information indicating a kind or attribute of the clipped content. Referring to FIG. 5A, for example, the additional information may be displayed to overlap at least a part of the selection area 520 or may be displayed to be adjacent to the selection area 520 in the form of an icon 524.

According to an exemplary embodiment, the user may access the clipped contents through a specific application (for example, a scrap application). For example, the specific application may be an application that classifies the clipped contents and provides the contents to the user in various methods. For example, similarly to the example of FIG. 5B, the application may provide the clipped contents through the user interface 500. For example, the application may provide a function of sharing the clipped contents with another device or another user through a communication interface (for example, the communication interface 160).

For example, the clipped contents may be classified based on a variety of related information. The related information may be comprised of a title, an original data location, a creator, a generation date, a category, disclosure rights, a user memo, an expiry date, GPS information, data abstract, information on an application in which clipping is performed, a kind of clip binary data, a size and display location of a thumbnail image, metadata information, or a combination thereof. The metadata may include at least one of location and details of the contents, information on the creator, a condition of right, a condition of utilization, and a history of utilization.

For example, the user may retrieve specific data (information) using the metadata. For example, by using the metadata, the user may extract information on an actor from a specific scene of a movie or may extract only a goal scene from soccer match video. According to an exemplary embodiment, the contents may automatically be classified and stored using the metadata information. For example, the contents may be classified according to rights information, a version, a size, a time, a location, and the like of the corresponding file included in the metadata.

According to an exemplary embodiment, the operation of selecting and storing (for example, clipping) the digital information may be performed with respect to multimedia contents. For example, the user may designate at least a part of a screen in which a moving image or an audio content is executed through a drag input. A part of the moving image or audio contents corresponding to a start point of time and an end point of time of the drag input may be stored.

According to an exemplary embodiment, the user input on the multimedia contents may be performed on a progress bar displayed on the screen. For example, the user may designate a selection area of a curved shape using an input tool (for example, an electronic pen). For example, when the selection area includes the progress bar, the determination module 220 may determine a first location and a second location of the progress bar included in the selection area. For example, the first location may correspond to the earliest time (for example, a low number) of time information of the contents indicated by the progress bar included in the selection area. Similarly, the second location may correspond to the last time (for example, a high number) of the time information of the contents indicated by the progress bar included in the selection area. For example, the obtaining module 230 may store at least a part of the multimedia contents corresponding to selected time information as clip content.

FIGS. 6A and 6B illustrate an example of a user interface 600 which is provided by an electronic device (for example, the electronic device 100) according to various exemplary embodiments. Referring to FIGS. 6A and 6B, the user interface 600 may be provided through a message application. According to an exemplary embodiment, the user of the electronic device (for example, the electronic device 100) may receive contact information through the message application 610. The contact information may include at least one piece of information of an image 612, a name 614, and a phone number 616.

According to an exemplary embodiment, the user may perform an input to select the contact information on the display area to store the contact information in the electronic device (for example, the electronic device 100). The selection input may be performed by inputting a looped curve using an input tool such as an electronic pen 602. A selection area may be designated by inputting hovering or a straight line to a point where information to be clipped is displayed. The user interface 600 may display a section area 620 on the screen. When the contact information is selected, the user interface 600 may provide kinds or attributes of the contents to be clipped in the form of an icon 618.

According to an exemplary embodiment, information 630 of a related application which is related to the clipped contents may be provided through the user interface 600. For example, the related application may be selected under the control of the application module 240. As shown in FIG. 6A, one or more options (icons) indicating the related application may be displayed on at least a part of the display (for example, a lower portion). For example, an option 632 may be information indicating an application for classifying and managing clip data (for example, a scrap application). For example, an option 634 may be information indicating a telephone book application for storing clipped contact information.

According to an exemplary embodiment, the information of the related application may be displayed in a way based on the attribute of the clipped contents. For example, the telephone book application may be displayed on a relatively higher level of the list (for example, the left side) than the other applications, based on the analysis that the clipped contents are the contact information.

According to an exemplary embodiment, the user may select at least one of the options displayed on the screen to execute the telephone book application through the user interface 600. For example, when a selection input for the option 634 is performed, an application 640 (for example, the telephone book application) corresponding to the option 634 may be displayed through the user interface 600, as shown in FIG. 6B.

According to an exemplary embodiment, the area where the related application is displayed may be the whole screen or a part of the whole screen. For example, when the related application is displayed on a part of the screen, the application in which the clip operation is performed (for example, the message application 610) may be displayed on the other part of the screen.

According to an exemplary embodiment, the telephone book application may be executed with at least a part of the clipped contents being input to an input window (or a field) of the telephone book application. For example, as shown in FIG. 6B, the image 612 may be input to a photo field 642 of the telephone book application 640. For example, the name 614 may be input to a name field 644 of the telephone book application 640. Similarly, the phone number 616 may be input to a phone number field 645 of the telephone book application 640.

According to an exemplary embodiment, when the related application is executed, the user interface 600 may provide an option for using the clipped contents along with the application. For example, the user interface 600 may provide one or more options (icons) 650 to select the whole of the clipped contents or a part of the clipped contents on a part of the display screen. Accordingly, the user may alternatively or additionally input the information of the clipped contents to the application by selecting a part of the options.

For example, the message application may be displayed on the upper portion of the display screen and the options (for example, a clip content selection icon) may be displayed on the lower portion. At least one of the icons related to the clipped contents displayed on the lower portion may correspond to a name or a phone number which is one of the pieces of contact information. For example, when the user selects the icon indicating the phone number and moves this icon to at least a part of the area of the upper portion where the message application is displayed, the corresponding phone number may be input to a receiver information input window.

Figure 7:
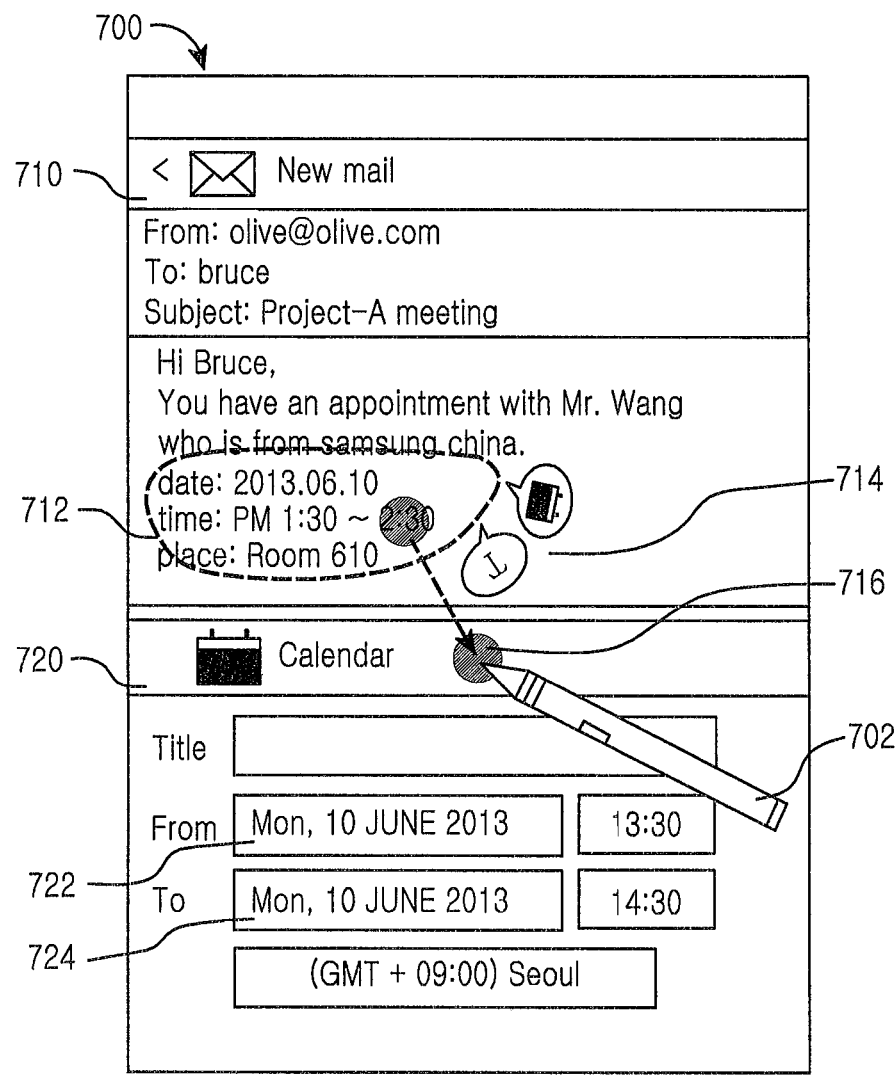
FIG. 7 illustrates a view showing an example of a user interface which is provided by an electronic device according to various exemplary embodiments.

FIG. 7 illustrates a view showing an example of a user interface 700 which is provided by an electronic device (for example, the electronic device 100) according to various exemplary embodiments. For example, the electronic device (for example, the electronic device 100) may execute a plurality of applications and display at least a part of the executed applications on a screen.

According to an exemplary embodiment, the user interface 700 may include an email application 710 and a calendar application 720 as shown in FIG. 7. For example, the email application 710 may provide text information including at least one of a schedule, a time, and a place.

According to an exemplary embodiment, the user may perform an input to select at least a part of the text information provided by the email application 710. For example, the selection input may be performed by inputting a looped curve using an input tool such as an electronic pen 702. A selection area may be designated by inputting hovering or a straight line to a point where information to be clipped is displayed. The user interface 700 may display a selection area 712 on the screen.

According to an exemplary embodiment, when the selection input is performed, text information included in the selection input may be analyzed and a type of the text information may be identified. For example, the selected text information may be classified into at least one type of a date, a start time, an end time, and a place under the control of the object analysis module 340. When contact information is selected, the user interface 700 may provide kinds or attributes of the clipped contents in the form of an icon 714 based on the type.

According to an exemplary embodiment, at least a part of the area of the selection area 712 may be designated and an input 716 to move to another area of the display (for example, referred to as a "drag and drop paste" for convenience of explanation) may be received through the display (for example, a touch screen). For example, the user may move the selection area 712 located on the email application 710 to a location included in the area where the calendar application 720 is displayed.

According to an exemplary embodiment, when the user input 716 (for example, the drag and drop paste) enters the area where the calendar application 720 is displayed, at least a part of the clipped information may be input to an input window (or a field) of the calendar application 720. For example, date, start time, end time, and place information may be input according to attributes of the input window items and may be displayed. Referring to FIG. 7, the date and time information of the clipped contents may be input to correspond to the input windows 722 and 724 of the calendar application.

According to an exemplary embodiment, when the shape or format of the input window item is different from the clipped contents, data of the clipped contents may be changed to a format suitable to the input window and input. For example, the clipped date content may be displayed in order of year, month, and day (for example, 2013.06.10) and the field to which the content is input may have the order of day, month, and year (for example, a different format from that of the clipped date content). In this embodiment, the content "2013.06.10" may be changed to "10.06.2013" or "10 JUNE 2013" and may be input. Similarly, referring to FIG. 7, the time information included in the clipped contents, "PM 1:30~2:30", may be input to be suitable to the attribute of the input window. For example, the clipped time information may be divided into a start time and an end time based on the analysis of the symbol "~", and may be changed to a 24-hour format.

Additionally, information to be input may be generated based on the clipped contents and the generated information may be input. For example, referring to FIG. 7, when the clipped contents do not include information of a day of the week, but there is an attribute corresponding to information of a day of the week in the input window, information of the day of the week corresponding to the clipped date information may be identified and the date information including the information of the day of the week may be input to the input window.

According to various exemplary embodiments, the electronic device 100 may include an interface module 210 which displays one or more representing objects for representing contents on a display area, a determination module 220 which recognizes a selection area which is at least a part of the display area, based on a user input, and an obtaining module 230 which detects a representing object at least a part of which is included in the selection area from among the one or more representing objects, as a clip object corresponding to the user input, based on the location information, and obtains a content corresponding to the clip object.

According to various exemplary embodiments, the interface module 210 may recognize an insertion object which is at least a part of the one or more representing objects based on another user input, and may insert a content that has the same attribute as that of a content corresponding to the insertion object from among the contents corresponding to the clip objects into the insertion object.

According to various exemplary embodiments, the electronic device 100 may further include an application module 240 which provides information indicating at least one application related to attributes of the contents corresponding to the clip objects.

According to various exemplary embodiments, the application may include at least one input window to insert a content of a specific attribute, and the application module 240 may be set to insert a content that corresponds to the specific attribute from among the contents corresponding to the clip objects into the input window.

According to various exemplary embodiments, the determination module 220 may be set to change the selection area to include all of the clip objects.

According to various exemplary embodiments, location information of each of the one or more representing objects and a content corresponding to each of the one or more representing objects may be stored as data of nodes corresponding to the one or more representing objects in a data structure (for example, a hierarchy, a tree) in which one or more nodes are connected to one another. The obtaining module 230 may be set to detect the nodes corresponding to the clip objects from the data structure based on the location information of the selection area.

Figure 8:
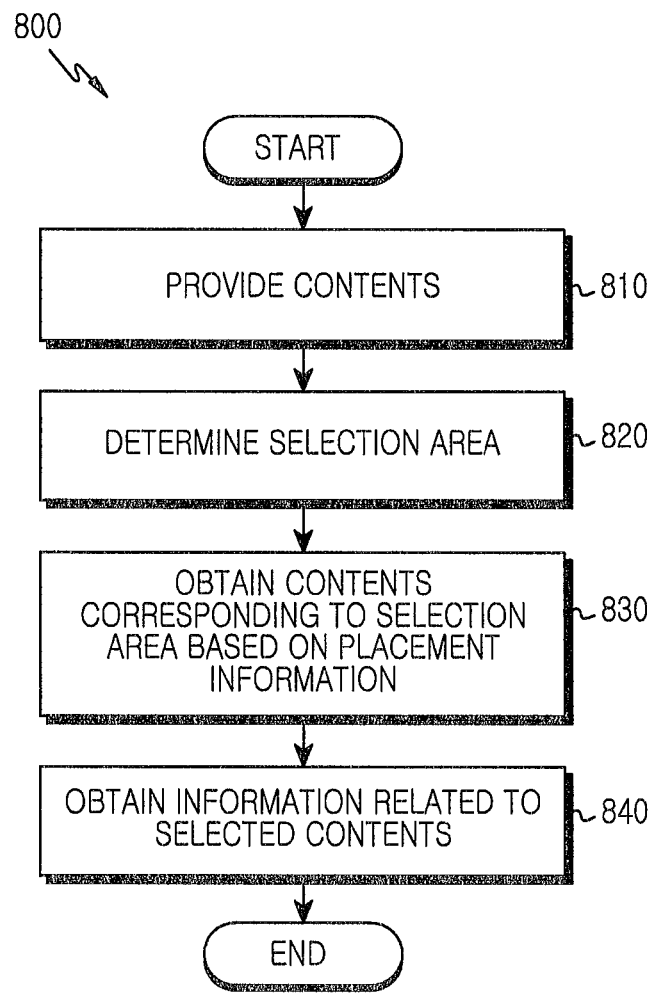
FIG. 8 illustrates a process for providing information according to various exemplary embodiments.

FIG. 8 illustrates a process a flowchart 800 illustrating a method for providing information according to various exemplary embodiments.

In operation 810, an electronic device (for example, the electronic device 100) may provide one or more contents through a display (for example, the display 150). The contents may include a variety of pieces of digital information including an image, a text, audio, and video.

In operation 820, the electronic device (for example, the electronic device 100) may determine a selection area which is at least a part of an area of the display (for example, the display 150). For example, the selection area may be determined based on a user input which is detected by an input device (for example, the input and output interface 140) functionally connected with the electronic device (for example, the electronic device 100).

According to an exemplary embodiment, the selection area may be changed based on one or more contents at least a part of which is included in the selection area.

In operation 830, the electronic device (for example, the electronic device 100) may obtain one or more contents at least a part of which is included in the selection area. For example, the one or more contents may be obtained by detecting contents corresponding to the selection area according to placement information (or location information) constituting the screen of the display (for example, the display 150). According to an exemplary embodiment, when the contents corresponding to the selection area is detected, the detected contents may be obtained as user selection contents.

In operation 840, the electronic device (for example, the electronic device 100) may obtain information related to the selected contents. The related information may include a content type, a display attribute, surrounding information (for example, application information, location information, time information, rights information, original data information, metadata, thumbnail, and sensor information) or a combination thereof. According to an exemplary embodiment, the electronic device (for example, the obtaining module 230) may analyze the selected contents and may generate additional information. For example, when the type of the contents is a text, the electronic device may determine whether the text include at least one of a URL, contact information, a schedule, a name, an address, and an email and may store the additional information.

Figure 9:
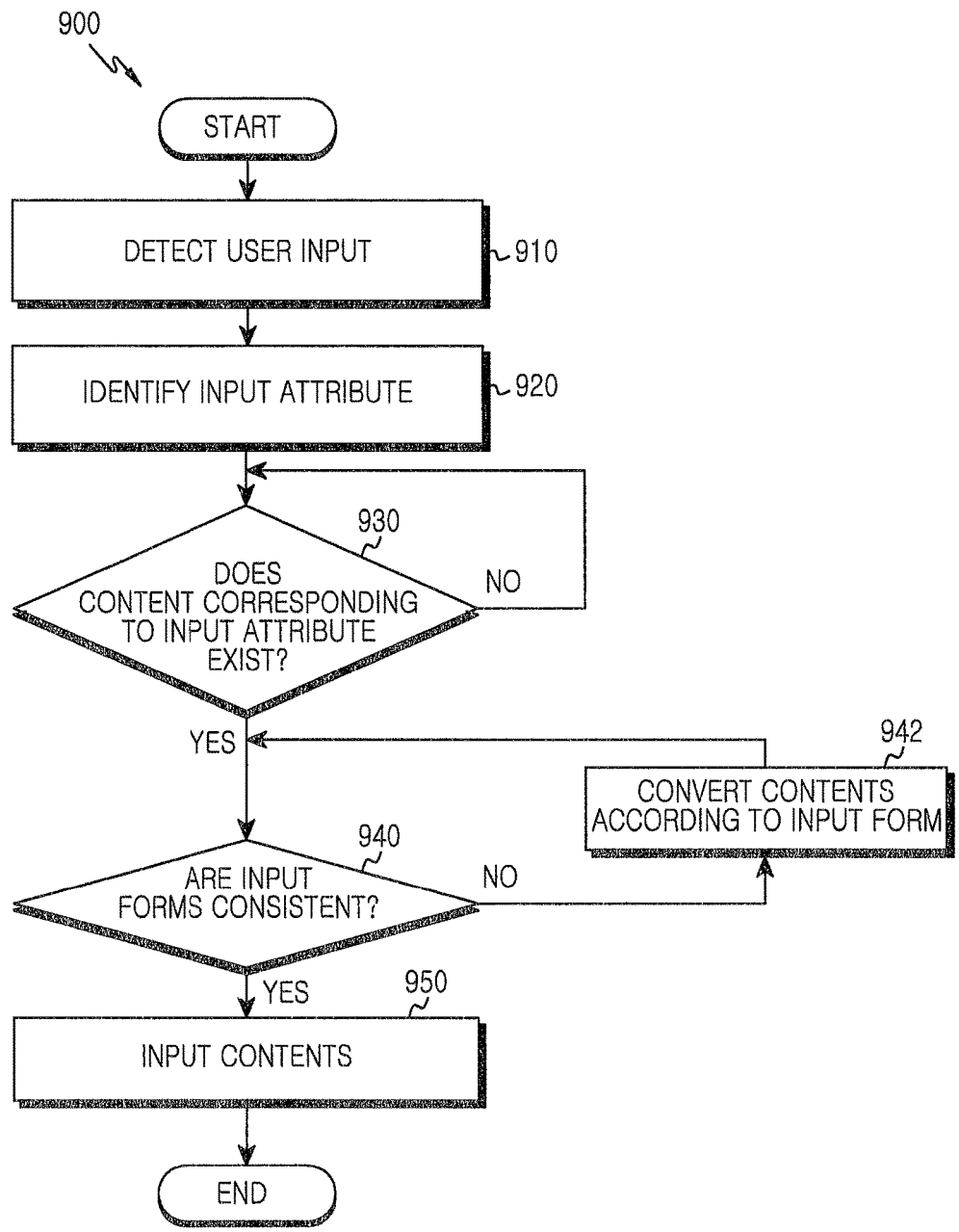
FIG. 9 illustrates a process for providing information according to various exemplary embodiments.

FIG. 9 illustrates a process a flowchart 900 illustrating a method for providing information according to various exemplary embodiments.

In operation 910, an electronic device (for example, the electronic device 100) may detect a user input through a touch screen (for example, the input and output interface 140). The user input may be an input related to an operation of inputting the contents obtained in operations 810 to 840 to a specific application (for example, a pasting operation).

In operation 920, the electronic device (for example, the electronic device 100) may identify an input attribute of the application in which the user input is performed. For example, the application (or program) may be an application that deals with a specific type of contents like a word processor or an image application. In this embodiment, the electronic device may determine the input attribute based on the type of the contents dealt with by the application.

According to an exemplary embodiment, the application includes one or more input windows (or fields). For example, the input window may have an attribute corresponding to a text, an image, audio or a moving image. For example, the input window may be included in the display screen as an insertion object for inputting at least one of a date, a day of the week, a month, a year, a time, a place, a phone number, an email, a URI, a URL, a URN, an address, a name, a title, an ID, a password, an icon, a sentence symbol, and a page number is input. The electronic device (for example, the application module 240) may determine a corresponding input item as an input attribute for the input window.

In operation 930, the electronic device (for example, the electronic device 100) may check whether there is an obtained (clipped) content corresponding to the input attribute. For example, when there is the obtained content corresponding to the input attribute, the content may be input to the application.

According to an exemplary embodiment, when the application is an application that deals with a specific type of contents like a word processor or an image application, at least a part or entirety of the obtained contents may be converted into the contents of the specific type dealt with by the application and may be input. According to an exemplary embodiment, when the application includes one or more input windows, at least a part of the obtained contents may be input to the input window corresponding to the attribute of the contents.

In operation 940, the electronic device (for example, the electronic device 100) may compare input formats of the contents and the application.

In operation 942, when the input formats of the contents and the application are different from each other, the electronic device (for example, the electronic device 100) may convert the format of the contents. For example, when the format of the content is different from the input format of the application or the input window, the format of the contents may be changed to be suitable to the application or input window.

In operation 950, the electronic device (for example, the electronic device 100) may input (or insert) the obtained contents to the application or input window based on a user input.

According to various exemplary embodiments, a method for obtaining information in an electronic device may include operations of: displaying one or more representing objects for representing contents on a display area; determining a selection area which is at least a part of the display area based on a user input; detecting a representing object at least a part of which corresponds to the selection area from among the one or more representing objects, as a clip object corresponding to the user input; and recognizing a content corresponding to the clip object.

According to various exemplary embodiments, the method may further include an operation of displaying an attribute of the content corresponding to the clip object to overlap at least a part of the clip object on the display area, or displaying the attribute of the content to be adjacent to the clip object.

According to various exemplary embodiments, the attribute of the content may include at least one of a text, an image, video, audio, and a URI.

According to various exemplary embodiments, the operation of recognizing may include an operation of adjusting the selection area to include all of the clip objects.

According to various exemplary embodiments, the method may further include operations of: recognizing an insertion object which is at least a part of the one or more representing objects based on another user input, inserting at least a part of the contents corresponding to the clip objects as at least a part of a content corresponding to the insertion object, and displaying the content corresponding to the insertion object through the insertion object.

According to various exemplary embodiments, the operation of inserting may include an operation of inserting a content that has the same attribute as that of the content corresponding to the insertion object from among the contents corresponding to the clip objects.

According to various exemplary embodiments, location information of each of the one or more representing objects and contents corresponding to the one or more representing objects may be stored as data of nodes corresponding to the one or more representing objects in a data structure (for example, a hierarchy, a tree) in which one or more nodes are connected to one another.

According to various exemplary embodiments, the operation of detecting may include an operation of detecting nodes corresponding to the clip objects from the data structure based on location information of the selection area.

According to various exemplary embodiments, the operation of detecting may include an operation of detecting representing objects corresponding to hierarchically connected nodes of the nodes corresponding to the representing objects at least part of which is included in the selection area in the data structure, as a part of the clip objects.

According to various exemplary embodiments, the operation of detecting may include an operation of displaying the clip objects differently from the other representing objects displayed on the display.

According to various exemplary embodiments, the representing objects at least a part of which is included in the selection area include a plurality of representing objects corresponding to a plurality of applications, and the operation of detecting may include an operation of detecting a representing object corresponding to an activated application from among the plurality of applications as the clip object corresponding to the user input.

According to various exemplary embodiments, the operation of obtaining may include an operation of obtaining a captured image of the selection area as at least a part of the contents corresponding to the clip objects.

According to various exemplary embodiments, the operation of obtaining may include operations of: providing information indicating at least one application related to the attributes of the contents corresponding to the clip objects, and activating an application that corresponds to another user input from among the at least one application.

According to various exemplary embodiments, the application corresponding to the another user input includes at least one input window for inserting a content of a specific attribute, and the operation of activating may include an operation of inserting a content that corresponds to the specific attribute from among the contents corresponding to the clip objects into the input window.

According to various exemplary embodiments, the operation of obtaining may include operations of: extracting at least one text from another user input, generating text data based on the extracted text, and obtaining data of the text as at least a part of the contents of the clip objects.

According various exemplary embodiments, the operation of obtaining may include an operation of further obtaining at least one of display attributes of the clip objects and information related to an application including the clip objects.

Figure 10:
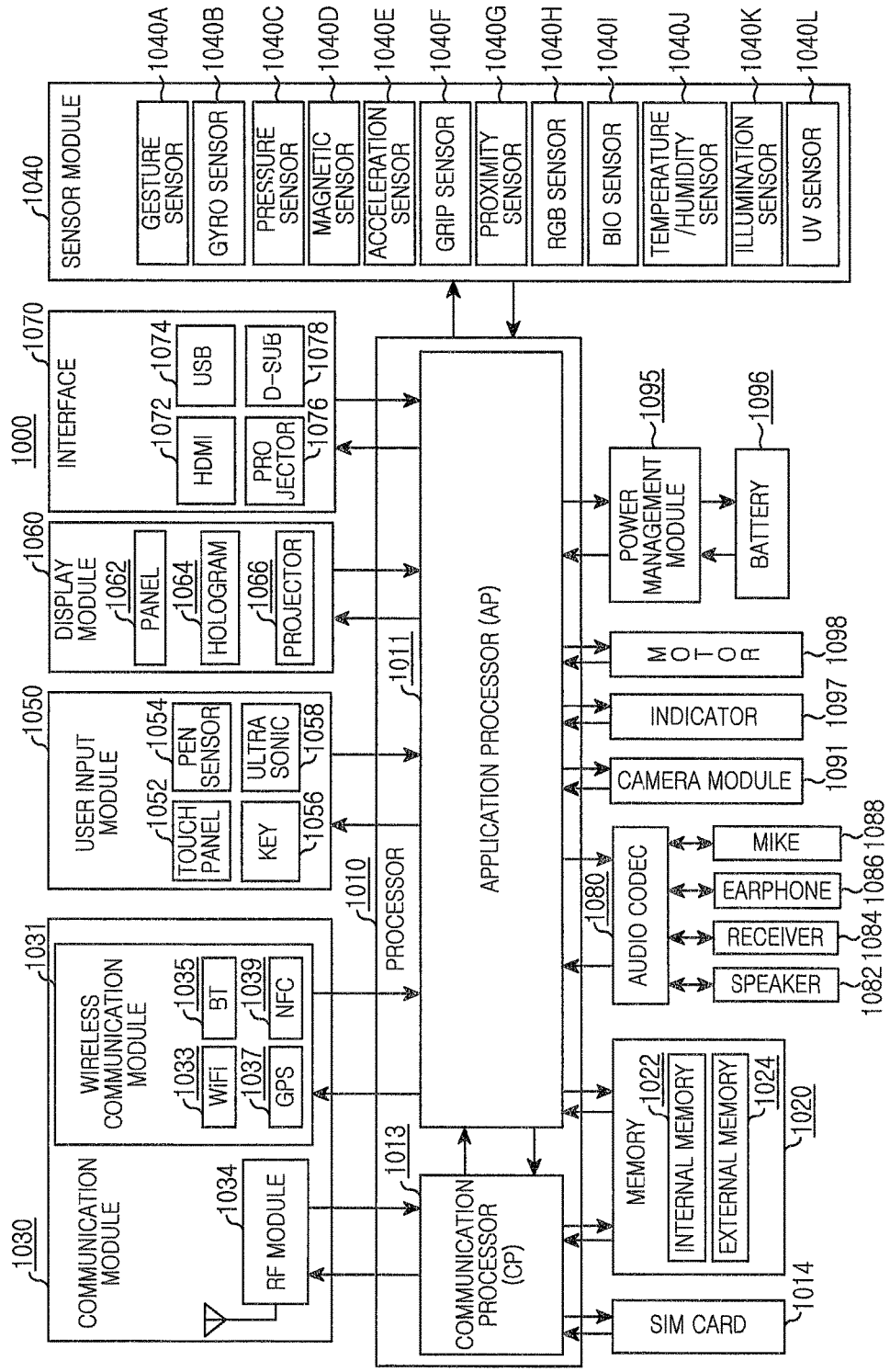
FIG. 10 illustrates a block diagram of an electronic device according to various exemplary embodiments.

FIG. 10 illustrates a block diagram of an electronic device 1000 (for example, the electronic device 100) according to various exemplary embodiments. The electronic device 1000 may configure an entirety or part of the electronic device 100 shown in FIG. 1. Referring to FIG. 1, the electronic device 1000 may include one or more processors 1010, a Subscriber Identification Module (SIM) card 1014, a memory 1020, a communication module 1030, a sensor module 1040, an input module 1050, a display 1060, an interface 1070, an audio module 1080, a camera module 1091, a power management module 1095, a battery 1096, an indicator 1097, or a motor 1098.

The processor 1010 (for example, the processor 120) may include one or more Application Processors (APs) 1011 or one or more Communication Processors (CPs) 1013. For example, the processor 1010 may be the processor 120 shown in FIG. 1. Although the AP 1011 and the CP 1013 are included in the processor 1010 in FIG. 10, the AP 1011 and the CP 1013 may be included in different Integrated Circuit (IC) packages. According to an exemplary embodiment, the AP 1011 and the CP 1013 may be included in a single IC package.

The AP 1011 may control a plurality of hardware or software elements connected to the AP 1011 by driving an operating system or an application program, and may process and calculate a variety of data including multimedia data. For example, the AP 1011 may be implemented by using a System on Chip (SoC). According to an exemplary embodiment, the processor 1010 may further include a Graphics Processing Unit (GPU) (not shown).

The CP 1013 may perform functions of managing a data link in communication between the electronic device 1000 (for example, the electronic device 100) and other electronic devices connected through a network, and converting a communication protocol. The CP 1013 may be implemented by using a SoC, for example. According to an exemplary embodiment, the CP 1013 may perform at least a part of multimedia control functions. For example, the CP 1013 may identify and authenticate a terminal in the communication network using a SIM (for example, the SIM card 1014). In addition, the CP 1013 may provide services such as voice communication, video communication, a text message, packet data, and the like to the user.

In addition, the CP 1013 may control data exchange of the communication module 1030. Although the elements like the CP 1013, the power management module 1095, or the memory 1020 are separate elements from the AP 1011 in FIG. 10, the AP 1011 may be implemented to include at least a part of the above-mentioned elements (for example, the CP 1013) according to an exemplary embodiment.

According to an exemplary embodiment, the AP 1011 or the CP 1013 may load an instruction or data which is received from a non-volatile memory or at least one of other elements connected to the AP 1011 and the CP 1013 into a volatile memory, and may process the instruction or data. In addition, the AP 1011 or the CP 1013 may store data which is received from at least one of other elements or data which is generated by at least one of other elements in the non-volatile memory.

The SIM card 1014 may be a card in which a subscriber identification module is implemented, and may be inserted into a slot formed on a specific location of the electronic device. The SIM card 1014 may include its unique identification information (for example, an Integrated Circuit Card Identifier (ICCID)) or subscriber information (for example, International Mobile Subscriber Identity (IMSI)).

The memory 1020 may include an internal memory 1022 or an external memory 1024. For example, the memory 1020 may be the memory 130 shown in FIG. 1. For example, the internal memory 1022 may include at least one of a volatile memory (for example, a Dynamic Random Access Memory (DRAM), a Static Random Access Memory (SRAM), a Synchronous DRAM (SDRAM), and the like) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, a NOR flash memory, and the like). According to an exemplary embodiment, the internal memory 1022 may be a Solid State Driver (SSD). The external memory 1024 may further include a flash driver, for example, Compact Flash (CF), Secure Digital (SD), Micro-SD, Mini-SD, xD, memory stick, and the like. The external memory 1024 may be functionally connected with the electronic device 1000 through various interfaces.

Although not shown, the electronic device 1000 may further include a storage device (or a storage medium) such as a hard drive.

The communication module 1030 may include a wireless communication module 1031 or a Radio Frequency (RF) module 1034. For example, the communication module 1030 may be included in the communication interface 160 shown in FIG. 1. For example, the wireless communication module 1031 may include WiFi 1033, BT 1035, GPS 1037, or NFC 1039. For example, the wireless communication module 1031 may provide a wireless communication function using radio frequency. Additionally or alternatively, the wireless communication module 1031 may include a network interface (for example, a LAN card) or a modem for connecting the electronic device 1000 to a network (for example, Internet, LAN, WAN, a telecommunication network, a cellular network, a satellite network, POTS, and the like)

The RF module 1034 may process exchange of voice or data signals. Although not shown, the RF module 1034 may include a transceiver, a Pluggable Authentication Module (PAM), a frequency filter, or a Low Noise Amplifier (LNA), for example. In addition, the RF module 1034 may further part for exchanging electromagnetic waves in a free space in wireless communication, for example, a conductor or conducting wire.

For example, the sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a Red, Green, Blue (RGB) sensor 1040H, a biosensor 1040I, a temperature/humidity sensor 1040J, an illumination sensor 1040K, a Ultraviolet (UV) sensor 1040L, and an Infrared Ray (IR) sensor (not shown). The sensor module 1040 may measure a physical quantity or detect an operation state of the electronic device, and convert measured or detected information into electric signals. Additionally or alternatively, the sensor module 1040 may include an odor sensor (not shown), an electromyography (EMG) sensor (not shown), an electroencephalogram (EEG) sensor (not shown), an electrocardiogram (ECG) sensor (not shown), a fingerprint sensor, and the like. The sensor module 1040 may further include a control circuit to control at least one sensor included therein.

The input module 1050 may include a touch panel 1052, a (digital) pen sensor 1054, a key 1056, or an ultrasonic input device 1058. For example, the input module 1050 may be included in the input and output interface 140 shown in FIG. 1. For example, the touch panel 1052 may recognize a touch input in at least one method of capacitive, resistive, infrared, and ultrasonic methods. In addition, the touch panel 1052 may further include a controller (not shown). In the embodiment of a capacitive method, the touch panel 1052 may recognize not only physical contact but also approach. The touch panel 1052 may further include a tactile function. In this embodiment, the touch panel 1052 may provide a tactile response to the user.

The (digital) pen sensor 1054 may be implemented in the same or similar method as or to the method of receiving a user's touch input or by using a separate recognition sheet. The key 1056 may include a physical button, for example. In addition, for example, the key 1056 may include an optical key, a keypad, or a touch key. The ultrasonic input device 1058 allows a terminal to detect sound waves through a microphone (for example, the microphone 1088) through an input device generating ultrasonic signals, and is capable of wireless recognition. According to an exemplary embodiment, the electronic device 1000 may receive a user input from an external device connected thereto (for example, a network, a computer, or a server) by using the communication module 1030.

The display 1060 may include a panel 1062, a hologram 1064, or a projector 1066. For example, the display 1060 may be the display 150 shown in FIG. 1. For example, the panel 1062 may be a Liquid Crystal Display (LCD) or an Active Matrix Organic Light Emitting Diode (AM-OLED). For example, the panel 1062 may be implemented flexibly, transparently, or to be wearable. The panel 1062 may be configured as a single module along with the touch panel 1052. The hologram 1064 may show a stereoscopic image in the air using interference of light. According to an exemplary embodiment, the display 1060 may further include a control circuit to control the panel 1062 or the hologram 1064.

The interface 1070 may include a High Definition Multimedia Interface (HDMI) 1072, a Universal Serial Bus (USB) 1074, Optical 1076, or D-sub 1078. For example, the communication module 1030 may be included in the communication interface 160 shown in FIG. 1. Additionally or alternatively, the interface 1070 may include a Secure Digital (SD)/Multimedia Card (MMC) (not shown) or Infrared Data Association (IRDA) (not shown).

The audio module 1080 may convert a sound and electric signal bidirectionally. For example, the audio module 1080 may be included in the input and output interface 140 shown in FIG. 1. The audio module 1080 may process sound information which is input or output through a speaker 1082, a receiver 1084, an earphone 1086, or a microphone 1088.

The camera module 1091 is an device for photographing an image and a moving image, and may include one or more image sensors (for example, a front surface sensor or a rear surface sensor), a lens, an Image Signal Processor (ISP) (not shown), or a flash (memory) (for example, a Light Emitting Diode (LED) or a xenon lamp).

The power management module 1095 may manage power of the electronic device 1000. Although not shown, the power management module 1095 may include a Power Management IC (PMIC), a charging IC, or a battery gage.

For example, the PMIC may be mounted in an integrated circuit or a SoC semiconductor. The charging method may be divided into a wired charging method and a wireless charging method. The charging IC may charge a battery and may prevent inflow of overvoltage or over current from a charger. According to an exemplary embodiment, the charging IC may include a charging IC for at least one of the wired charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gage may measure a remaining battery life of the battery 1096, a voltage, a current, or temperature during charging. The battery 1096 stores electricity and supplies power. The battery 1096 may include a rechargeable battery or a solar cell.

The indicator 1097 may display a specific state of the electronic device 1000 or a part of it (for example, the AP 1011), for example, a booting state, a message state, or a charging state. The motor 1098 may convert an electric signal into a mechanical vibration.

Although not shown, the electronic device 100 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

For example, the method and device for obtaining the information according to various exemplary embodiments can easily select and store a variety of digital information provided by the electronic device by extracting data based on contents.

For example, the method and device for obtaining the information according to various exemplary embodiments can improve user convenience by providing the functions of easily transmitting and using various kinds of data between the electronic device and the applications.

According to various exemplary embodiment, in a storing medium for storing instructions, the instructions are set to allow at least one processor to perform at least one operation when the instructions are executed by the at least one processor, and the at least one operation may include operations of: displaying one or more representing objects for representing contents on a display area; determining a selection area which is at least a part of the display area based on a user input; detecting a representing object at least a part of which corresponds to the selection area from among the at least one representing objects, as a clip object corresponding to the user input; and recognizing a content corresponding to the clip object.

Each of the above-described elements of the electronic device according to various exemplary embodiments of the present disclosure may be comprised of one or more parts, and the names of the elements may vary according to a kind of the electronic device. The electronic device according to various exemplary embodiments of the present disclosure may include at least one of the above-described elements, and some of the elements may be omitted or an additional element may be further included. In addition, some of the elements of the electronic device according to various exemplary embodiments of the present disclosure may be combined into a single object, and may perform the same functions as those of the elements before being combined.

The term "module" used in various exemplary embodiments of the present disclosure refers to a unit including one of hardware, software, and firmware, or a combination of two or more of them, for example. For example, the "module" may be used interchangeably with terms like unit, logic, logic block, part, circuit or circuitry. The "module" may be a minimum unit of an integrally configured part or a part of it. The "module" may be a minimum unit that performs one or more functions or a part of it. The "module" may be implemented mechanically or electronically. For example, the "module" according to various exemplary embodiments of the present disclosure may include at least one of an Application Specific Integrated Circuit (ASIC), Field Programmable Gate Arrays (FPGAs), and a programmable logic device which perform any operation that is already well known or will be developed in the future.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method of an electronic device, the method comprising:
    displaying, on a display area, a content comprising a plurality of images and a plurality of texts;
    in response to detecting a first input for designating a selection area included in the display area, identifying an image located in the selection area among the plurality of images and a text located in the selection area among the plurality of texts;
    storing, in a database, information regarding the image mapped to a first type and the text mapped to a second type;
    detecting a second input on an icon indicating an application to insert at least one of the image or the text into the application;
    identifying, in an entire area of a user interface (UI) of the application, a first area capable of receiving an object of the first type and a second area capable of receiving an object of the second type;
    respectively obtaining, by retrieving from the database based on the first type and the second type, the image mapped to the first type and the text mapped to the second type; and
    displaying, based on the obtaining from the database, the image in the first area which is associated with the first type, and the text in the second area which is associated with the second type, within the UI of the application.

2. The method of claim 1, further comprising:
    displaying, in response to the detecting the first input, a first icon indicating the first type and a second icon indicating the second type,
    wherein the first icon overlaps at least a part of the selection area or to be adjacent to the selection area, and
    wherein the second icon overlaps at least a part of the selection area or to be adjacent to the selection area.

3. The method of claim 1, wherein the content further comprising at least one video, at least one audio, or at least one uniform resource identifier (URI), and
    wherein the method further comprising:
    if the selection area further includes one of video, audio, or URL, storing information regarding the one of video, audio, or URL mapped to a third type;
    based on identifying a third area capable of receiving an object of the third type, obtaining the one of video, audio, or URL mapped to the third type; and
    displaying, within the UI, the third area into which the one of video, audio, or URL is inserted.

4. The method of claim 1, further comprising:
    displaying, within the UI, a bar comprising a first icon for inserting the image into the first area and a second icon for inserting the text into the second area.

5. The method of claim 4, further comprising:
    in response to detecting a third input on the first icon displayed in the bar, inputting the image on the first area displayed within the UI, and
    in response to detecting a fourth input on the second icon displayed in the bar, inputting the text on the second area displayed within the UI.

6. The method of claim 1, further comprising:
    identifying, based on the detecting the second input, whether the UI includes the first area capable of receiving the image;
    identifying, based on the identifying that the UI does not include a first area capable of receiving the image, a third area associated with a third type within the UI;
    converting, based on the identifying the third type, image into an object mapped to the third type; and
    inserting the converted object with the third type into the third area associated with the third type.

7. The method of claim 1, wherein location information of a plurality of objects included in the content and information on the plurality of objects included in the content are stored as data of nodes corresponding to the plurality of objects included in the content in a data structure in which one or more nodes are connected to one another.

8. The method of claim 7, further comprising:
    detecting a node corresponding to the location information of the image and the text included in the selection area from the data structure; and
    identifying, based on detecting the location information of the image and the text, the first type and the second type from the data structure.

9. The method of claim 7, further comprising detecting the image and the text corresponding to hierarchically connected nodes of nodes corresponding to objects at least part of which is comprised in the selection area in the data structure.

10. The method of claim 1, wherein the image and the text which are included in the selection area are highlighted relative to remaining objects among a plurality of objects.

11. The method of claim 1, wherein the identifying the image and the text comprises identifying the image and the text by parsing data associated with the content.

12. The method of claim 1, wherein the second input comprises a drag and drop input.

13. The method of claim 12, further comprising:
    in response to the detecting a start point of the second input, highlighting one or more applications capable of inserting at least one of the image or the text.

14. The method of claim 1, wherein the selection area comprises a closed curve area or a rectangular area,
    wherein the selection area is determined as the rectangular area by:
    detecting an input for drawing a non-closed curve;
    in response to the detecting the input for drawing the non-closed curve, detecting a start point of the non-closed curve and an end point of the non-closed curve; and determining the rectangular are having a diagonal line, wherein a straight line connecting the start point and the end point is determined as the diagonal line.

15. The method of claim 1, further comprising,
based on detecting the first input for designating the selection area, displaying a preview window for indicating the image and the text which are included in the selection area.

16. An electronic device comprising:
a memory storing instructions;
a processor, coupled to the memory, configured to execute the stored instructions to:
display, on a display area, a content comprising a plurality of images and a plurality of texts;
in response to detecting a first input for designating a selection area included in the display area, identify an image located in the selection area among the plurality of images and a text located in the selection area among the plurality of texts;
store, in a database, information regarding the image mapped to a first type and the text mapped to a second type,
detect a second input on an icon indicating an application to insert at least one of the image or the text into the application;
identify, in an entire area of a user interface (UI) of the application a first area capable of receiving an object of the first type and a second area capable of receiving an object of the second type;
respectively obtaining, by retrieving from the database based on the first type and the second type, the image mapped to the first type and the text mapped to the second type; and
display, based on the obtaining from the database, the image in the first area which is associated with the first type, and the text in the second area which is associated with the second type, within the UI of the application.

17. The electronic device of claim 16, wherein the processor is further configured to execute the instructions to:
displaying, in response to the detecting the first input, a first icon indicating the first type and a second icon indicating the second type,
wherein the first icon overlaps at least a part of the selection area or to be adjacent to the selection area, and
wherein the second icon overlaps at least a part of the selection area or to be adjacent to the selection area.

18. The electronic device of claim 16, wherein the content further comprising at least one video, at least one audio, or at least one uniform resource identifier (URI) mapped to a third type, and
wherein the processor is further configured to execute the instructions to:
if the selection area further includes one of video, audio, or URL, store information regarding the one of video, audio, or URL mapped to a third type;
obtain, based on identifying a third area capable of receiving an object of the third type, the one of video, audio, or URL mapped to the third type; and
display, within the UI, the third area into which the one of video, audio, or URL is inserted.

19. The electronic device of claim 16, wherein the processor is further configured to execute the instructions to display, within the UI, a bar comprising a first icon for inserting the image into the first area and a second icon for inserting the text into the second area.

20. The electronic device of claim 19, wherein the processor is further configured to execute the instructions to input, in response to detecting a third input on the first icon displayed in the bar, the image on the first area displayed within the UI, and
in response to detecting a fourth input on the second icon displayed in the bar, inputting the text on the second area displayed within the UI.

21. The electronic device of claim 16, wherein the processor is further configured to execute the instructions to:
identify, based on the detecting the second input, whether the UI includes the first area capable of receiving the image;
identify, based on the identifying that the UI does not include the first area capable of receiving the image, a third area associated with a third type within the UI;
convert, based on the identifying the third type, the image into an object mapped to the third type; and
insert the converted object with the third type into the third area associated with the third type.

22. A non-transitory computer readable storing medium for storing instructions, the instructions being set to allow at least one processor to perform at least one operation when the instructions are executed by the at least one processor, the at least one operation comprising operations of:
displaying on a display area, a content comprising a plurality of images and a plurality of texts;
in response to detecting a first input for designating a selection area included in the display area, identifying an image located in the selection area among the plurality of images and a text located in the selection area among the plurality of texts;
storing, in a database, information regarding the image mapped to a first type and the text mapped to a second type,
detecting a second input on an icon indicating an application to insert at least one of the image or the text into the application; and
identifying, in an entire area of a user interface (UI) of the application, a first area capable of receiving an object of the first type and a second area capable of receiving an object of the second type;
respectively obtaining, by retrieving from the database based on the first type and the second type, the image mapped to the first type and the text mapped to the second type; and
displaying, based on the obtaining from the database, the image in the first area which is associated with the first type, and the text in the second area which is associated with the second type, within the UI of the application.

\* \* \* \* \*